United States Patent
Watanabe et al.

(10) Patent No.: US 9,936,183 B2
(45) Date of Patent: Apr. 3, 2018

(54) PLAYBACK DEVICE

(71) Applicant: Sharp Kabushiki Kaisha, Sakai, Osaka (JP)

(72) Inventors: Shuichi Watanabe, Sakai (JP); Yasuaki Tokumo, Sakai (JP); Maki Takahashi, Sakai (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days.

(21) Appl. No.: 15/264,642

(22) Filed: Sep. 14, 2016

(65) Prior Publication Data

US 2017/0006274 A1 Jan. 5, 2017

Related U.S. Application Data

(63) Continuation of application No. 13/978,751, filed as application No. PCT/JP2012/050522 on Jan. 12, 2012, now Pat. No. 9,485,486.

(30) Foreign Application Priority Data

| Jan. 12, 2011 | (JP) | 2011-003522 |
| Mar. 10, 2011 | (JP) | 2011-053612 |
| Mar. 10, 2011 | (JP) | 2011-053613 |

(51) Int. Cl.
*H04N 9/87* (2006.01)
*H04N 21/8543* (2011.01)
*G11B 27/00* (2006.01)

(52) U.S. Cl.
CPC ............ *H04N 9/87* (2013.01); *G11B 27/007* (2013.01); *H04N 21/8543* (2013.01)

(58) Field of Classification Search
CPC ..... H04N 9/87; H04N 21/8543; G11B 27/007
See application file for complete search history.

(56) References Cited

U.S. PATENT DOCUMENTS

| 2003/0114968 A1* | 6/2003 | Sato ...................... G01C 21/26 701/36 |
| 2004/0260539 A1* | 12/2004 | Tagawa ................ G10H 1/0008 704/201 |
| 2006/0004871 A1* | 1/2006 | Hayama ............ G06F 17/30038 |
| 2007/0143268 A1* | 6/2007 | Chosokabe .......... G11B 27/034 |
| 2010/0046925 A1* | 2/2010 | Kusunoki .......... G06F 17/30858 386/239 |
| 2014/0270680 A1* | 9/2014 | Bloch ..................... G11B 27/11 386/201 |

OTHER PUBLICATIONS

Watanabe et al., "Playback Device, Control Method for Playback Device, Generating Device, Control Method for Generating Device, Recording Medium, Data Structure, Control Program, and Recording Medium Recording the Program", U.S. Appl. No. 13/978,751, filed Jul. 9, 2013.

* cited by examiner

*Primary Examiner* — Hung Dang
*Assistant Examiner* — Sunghyoun Park
(74) *Attorney, Agent, or Firm* — Keating & Bennett, LLP

(57) ABSTRACT

A client (1) is provisioned with a content selection unit (13) for referencing description information (26), selecting content to be played in a certain period, and at the same time, and selecting content to be played at the next period from an id of a subset that is the same as the subset selected at the period, a request execution unit (14) for requesting the transmission of the selected content, and a content playback unit (15) for continuously playing the content transmitted in response to the request.

1 Claim, 28 Drawing Sheets

FIG. 5

```
<MPD>
    <Period start="PT0S">                           Period#1
        <Subset id="1" default="true" >
            <Contains group="1"/>
            <Contains group="2"/>
        </Subset>
        <Subset id="2" default="false">
            <Contains group="1"/>
            <Contains group="3"/>
        </Subset>
        <Subset id="3" default="false">
            <Contains group="1"/>
            <Contains group="4"/>
        </Subset>
        ...
    </Period>
    <Period start="PT900S">                         Period#2
        <Subset id="1" default="true" >
            <Contains group="1"/>
            <Contains group="2"/>
        </Subset>
        <Subset id="2" default="false">
            <Contains group="1"/>
            <Contains group="3"/>
        </Subset>
        ...
    </Period>
    <Period start="PT960S">                         Period#3
        <Subset id="1" default="true" >
            <Contains group="1"/>
            <Contains group="2"/>
        </Subset>
        <Subset id="2" default="false">
            <Contains group="1"/>
            <Contains group="3"/>
        </Subset>
        <Subset id="3" default="true">
            <Contains group="1"/>
            <Contains group="4"/>
        </Subset>
        ...
    </Period>
    ...
</MPD>
```

FIG. 6

```
<MPD>
  <Period start="PT0S">
    <Subset id="0">         ── ADDITION OF
      <Contains group="1"/>    AN id = "0" TO THE Subset
      <Contains group="2"/>
    </Subset>
    <Subset id="1">         ── DESIGNATES THE Subset WITH
      <Contains group="3"/>    THE SAME id AND THE Subset WITH
      <Contains group="4"/>    id = "0" AS THE SET TO BE
    </Subset>                  CONTINUOUSLY SELECTED
    <Subset id="2">
      <Contains group="5"/>
    </Subset>
    ...
  </Period>
  <Period start="PT30S">
    <Subset id="0">
      <Contains group="1"/>
    </Subset>
    <Subset id="1">
      <Contains group="2"/>
    </Subset>
    <Subset id="2">
      <Contains group="3"/>
    </Subset>
    ...
  </Period>
</MPD>
```

FIG. 7

```
<MPD>
    <Period start="PT0S">                                    ← ADDITION OF A next
        <Subset id="1" next="1">       ← ADDITION OF AN id
            <Contains group="1"/>
            <Contains group="2"/>
        </Subset>
        <Subset id="2" next="1 2">
            <Contains group="3"/>
            <Contains group="4"/>
        </Subset>
        <Subset id="3" next="4">
            <Contains group="5"/>
        </Subset>
        ...
    </Period>
    <Period start="PT30S">
        <Subset id="1">
            <Contains group="1"/>
        </Subset>
        <Subset id="2">
            <Contains group="2"/>
        </Subset>
        <Subset id="4">
            <Contains group="3"/>
        </Subset>
        ...
    </Period>
</MPD>
```

FIG. 8

```
<MPD>
   <Period start="PT0S">
      <Subset id="1">                    ← ADDITION OF AN id
         <Contains group="1"/>
         <Contains group="2"/>
      </Subset>
      <Subset id="2">
         <Contains group="3"/>
         <Contains group="4"/>
      </Subset>
      <Subset id="3">
         <Contains group="5"/>
      </Subset>
      ...
   </Period>
   <Period start="PT30S">
      <Subset id="1" prev="1 2">
         <Contains group="1"/>         ← ADDITION OF A prev
      </Subset>
      <Subset id="2" prev="2">
         <Contains group="2"/>
      </Subset>
      <Subset id="4" prev="3">
         <Contains group="3"/>
      </Subset>
      ...
   </Period>
</MPD>
```

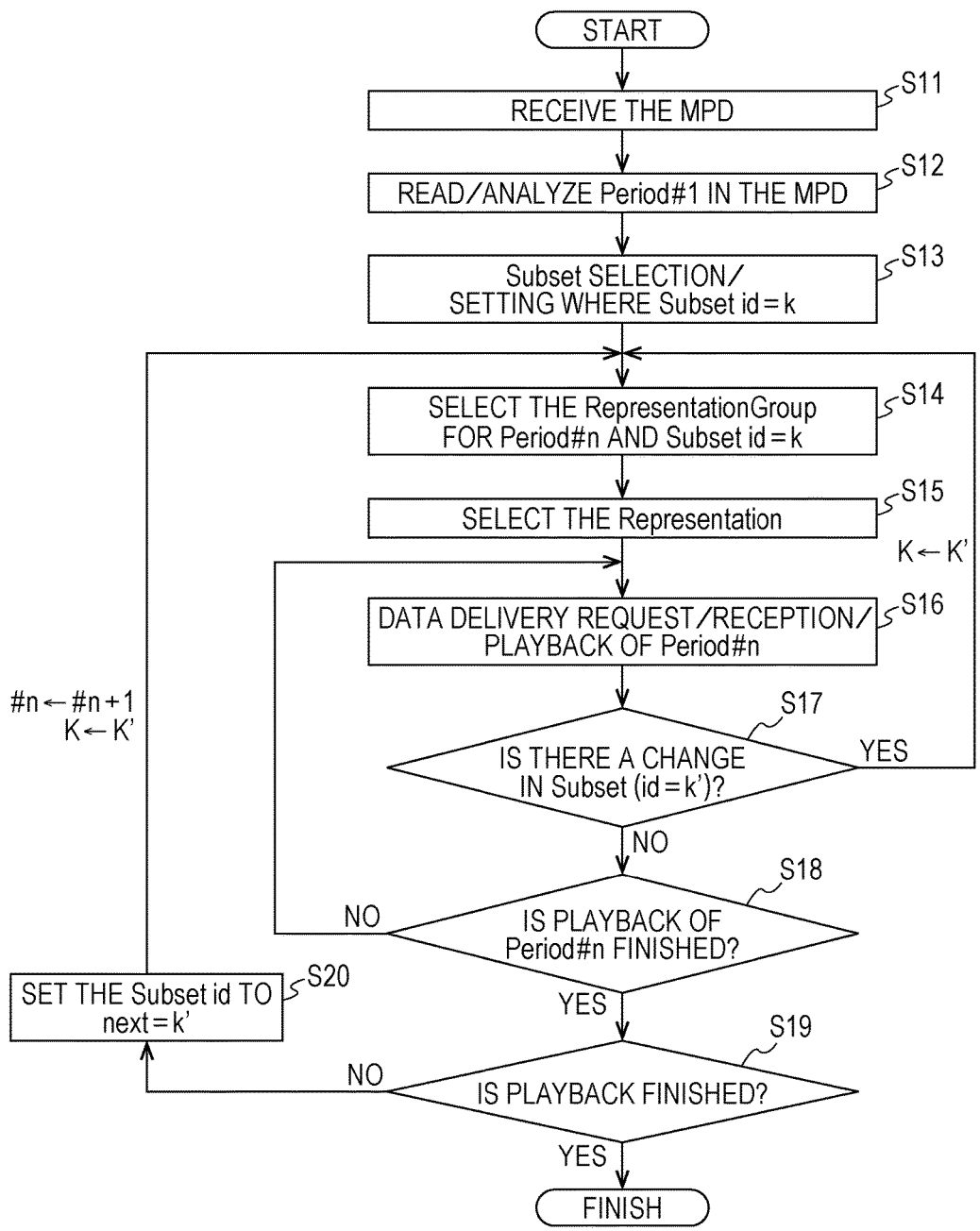

FIG. 11

```
<MPD>
  <Period start="PT0S">
    <Subset id="1" next="1">
      ...
    </Subset>
    <Subset id="2" next="2">
      ...
    </Subset>
    <Subset id="3" next="3">
      ...
    </Subset>
  </Period>
  <Period start="PT30S">
    <Subset id="1" prev="1" next="1">
      ...
    </Subset>
    <Subset id="2" prev="2" next="2">
      ...
    </Subset>
    <Subset id="4" prev="3" next="3">
      ...
    </Subset>
  </Period>
  <Period start="PT01M00S">
    <Subset id="1" prev="1" next="1">
      ...
    </Subset>
    <Subset id="2" prev="2" next="2">
      ...
    </Subset>
    <Subset id="4" prev="3" next="3">
      ...
    </Subset>
  </Period>
  ...
</MPD>
```

FIG. 16

```
<MPD>
   <Period start="PT0S">
     <Representation id="1" bandwidth="512000">
           ... </Representation>
     <Representation id="2" bandwidth="256000">
           ... </Representation>
     <Representation id="3" bandwidth="128000">
           ... </Representation >
   </Period>
   <Period start="PT10S">
     ...
   </Period>
   ...
</MPD>
```

FIG. 17

```
<MPD>
   <Period start="PT0S">
     <Representation id="1" group="1">
           ... </Representation>
     <Representation id="2" group="1">
           ... </Representation>
     <Representation id="3" group="1">
           ... </Representation>
     <Representation id="4" group="2">
           ... </Representation>
     <Representation id="5" group="2">
           ... </Representation>
   </Period>
   ...
</MPD>
```

FIG. 18

```
<MPD>
    <Period start="PT0S">
        <RepresentationGroup group="1">
            <Representation id="1"> ... </Representation>
            <Representation id="2"> ... </Representation>
            <Representation id="3"> ... </Representation>
        </RepresentationGroup>
        <RepresentationGroup group="2">
            <Representation id="4"> ... </Representation>
            <Representation id="5"> ... </Representation>
        </RepresentationGroup>
    </Period>
    ...
</MPD>
```

FIG. 19

```
<MPD>
    <Period start="PT0S">
        <Subset>
            <Contains group="1"/>
            <Contains group="2"/>
        </Subset>
        <Subset>
            <Contains group="1"/>
            <Contains group="3"/>
        </Subset>
        <RepresentationGroup group="1">
            <Representation id="1"> ...
            </Representation>
            <Representation id="2"> ...
            </Representation>
        </RepresentationGroup>
        <RepresentationGroup group="2">
            <Representation id="3"> ...
            </Representation>
            <Representation id="4"> ...
            </Representation>
        </RepresentationGroup>
        <RepresentationGroup group="3">
            <Representation id="5"> ...
            </Representation>
        </RepresentationGroup>
    </Period>
    ...
</MPD>
```

FIG. 20

```
<HTML>
 . . .
   <video src="http://example.com/content1.mpd#id=s1"></video>
 . . .
   <video src="http://example.com/content1.mpd#id=s2"></video>
 . . .
   <video src="http://example.com/content1.mpd#id=sn"></video>
 . . .
</HTML>
```

FIG. 28 http://example.com/content1.mpd

```
<MPD>
  <Period id="period11" xlink:show="new"
      xlink:href="http://example.com/Dorama_Ep1.mpd#id=period1," >
    ...
  </Period>
  <Period id="period12" xlink:show="new"
      xlink:href="http://example.com/Dorama_Ep1.mpd#id=period2," >
    ...
  </Period>
  <Period id="period13" xlink:show="new"
      xlink:href="http://example.com/Dorama_Ep1.mpd#id=period3," >
    ...
  </Period>

<Period id="periodN3" xlink:show="new"
      xlink:href="http://example.com/Dorama_epN.mpd#id=period3," >
    ...
  </Period>
</MPD>
```

FIG. 30

(a)  http://example.com/content1.mpd

```
<MPD>
  <Period start="PT0S" duration="PT3600S" xlink:show="new"
    xlink:href="http://example.com/content1_ff.mpd#t=idx:$idx," >
    ...
    <SegmentInfo >
        <Url sourceURL="content1_seg1.3gs" idx=1/>
        <Url sourceURL="content1_seg2.3gs" idx=2/>
        <Url sourceURL="content1_seg3.3gs" idx=3/>
        <Url sourceURL="content1_seg4.3gs" idx=4/>
        <Url sourceURL="content1_seg5.3gs" idx=5/>
        ...
        <Url sourceURL="content1_segN.3gs" idx=N/>
    </SegmentInfo>
  </Period>
</MPD>
```

(b)  http://example.com/content1_ff.mpd

```
<MPD>
  <Period start="PT0S" duration="PT360S" xlink:show="new"
    xlink:href="http://example.com/content1.mpd#t=idx:$idx," >
    ...
    <SegmentInfo >
        <Url sourceURL="ff_seg1.3gs" idx=1/>
        <Url sourceURL="ff_seg2.3gs" idx=2/>
        <Url sourceURL="ff_seg3.3gs" idx=3/>
        <Url sourceURL="ff_seg4.3gs" idx=4/>
        <Url sourceURL="ff_seg5.3gs" idx=5/>
        ...
        <Url sourceURL="ff_segN.3gs" idx=N/>
    </SegmentInfo>
  </Period>
</MPD>
```

PLAYBACK DEVICE

TECHNICAL FIELD

The present invention relates to a playback device or the like for playing content acquired through a communication network, and more specifically relates to a playback device that references a description information including information related to the content and determines the content to acquire.

BACKGROUND ART

According to the related art, technologies for performing the supply of content through a communication network are widely used. For example, PTL 1 below discloses a content streaming service system in which content requests are transmitted from a client to a server by HTTP, and the content received by the client as the response to this request is played as a stream.

A 3GPP AHS (Adaptive HTTP Streaming) is an example of such a system. It is known that according to 3GPP AHS, description information (metadata) called MPD (Media Presentation Description) is used. Content (media) attributes, playback order, and so on are written in the MPD, and are sent to the client before the streaming service or during the streaming service. Also, the client references the received MPD and determines the content to request to the server.

This MPD is written with periods (Period) representing time periods and representations (Representation) representing content information to be played during these time periods. The MPD is data such as that illustrated in FIG. 16, for example.

FIG. 16 is a diagram illustrating an example of the MPD according to the related art. The MPD in FIG. 16 begins with <Period start="PT0S">, includes the period (element) ending by the </Period>, begins again with the <Period start="PT10S">, and includes the period ending by the </Period>.

Also, three representations (elements) beginning with <Representation . . . > and ending with </Representation> are included in the period beginning with <Period start="PT0S">. In this way, the multiple representations included in one period represent a selection of content. That is to say, the multiple representations included in the same period indicate that any one of these may be selected for possible playback.

Also, each representation (element) may include attributes (Attribute) representing attributes of the content corresponding to the representation. Attributes that may be configured in representations may include information related to the content (particularly information related to the playback of content) such as codec, bitrate, frame rate, and resolution. Also, the client references the values of these attributes, and selects the representation.

For example, when there are multiple representations having different codecs, bitrates, frame rates, resolutions, and so on for the same video content, the client selects the representation corresponding to the codec, bitrate, frame rate, resolution, and so on that is playable on the device.

Further, according to the example in the figure, identifiers (id) for this representation and bitrate (as bandwidth in the figure) are described as attributes, but attributes are not limited to this example. Other attributes such as a MIME type (mimeType) representing playable data formats, for example, may be included.

Also, a group (group) attribute may be written to the MPD representation. The group represents different components, and though representations in the same group cannot be played back simultaneously, representations in different groups can be played back simultaneously.

This will be described with FIG. 17 as a basis. FIG. 17 is a diagram illustrating the related art, in which example MPD data including the group attribute is illustrated. According to this example, there are five representations with id=1 through 5 included in the period beginning with "PT0S".

The group of representations with id=1 through 3 from these five representations is a group "1", and the remaining two representations make up a group "2". In this case, neither can the representations with id=1 through 3 belonging to the same group be played simultaneously, nor can the representations with id=4, 5 be played simultaneously. Conversely, the representations in the group "1" and the representations in the group "2" may be played simultaneously. For example, the representation with the id=1 may be played back simultaneously with the representation with the id=4 or 5.

Also, according to MPEG DASH (Dynamic Adaptive Streaming over HTTP), an extension is performed to add the representation group (RepresentationGroup) element and a subset (Subset) element to the 3GPP AHS base.

The representation group is an element enabling representations belonging to the same group to be organized and described in a high order of the representations (or in parallel). This will be described with FIG. 18 as a basis. FIG. 18 is a diagram illustrating the related art, and is an example of MPD data including the representation group element.

According to this example, two representation group (elements) beginning with <RepresentationGroup . . . > and ending with </RepresentationGroup> are included in the period beginning with "PT0S".

Representations with id=1 through 3 are also included in a first representation group (representation group "1"). These three representations belong to the same group. Also, representations with id=4, 5 are included in a second representation group (representation group "2"). These two representations also belong to the same group.

Conversely, subsets are elements of representations in a high order (or in parallel) representing a set of groups that may be played back simultaneously. This will be described with FIG. 19 as a basis. FIG. 19 is a diagram illustrating the related art, and is an example of MPD data including the subset element.

According to this example, two subset (elements) beginning with <Subset> and ending with </Subset> are included in the period beginning with "PT0S". Also, described within a first subset is that a group 1 and a group 2 are included in this subset. Also, described within a second subset is that the group 1 and a group 3 are included in this subset.

That is to say, according to the period beginning with "PT0S", either the first or the second subset may be selected. Also, when the first subset is selected, any of the representations from at least either group 1 or 2 are selected. Similarly, when the second subset is selected, any of the representations from at least either group 1 or group 3 are selected.

Further, according to this example, three representation group elements "1" through "3" are described. Also, representations with id=1, 2 are included in the representation group "1", representations with id=3, 4 are included in the representation group "2", and a representation with an id=5 is included in the representation group "3".

That is to say, a subset is first selected from the period beginning with "PT0S", and then a representation group corresponding to the group specified by the selected subset is selected. Finally, at least one representation included in the selected representation group is selected. For example, when the first subset is selected, at least either the representation group "1" or "2" is selected. Also, when both of these are selected, at least one of the representations with id=1, 2, and at least one of the representations with id=3, 4 are selected.

Here, for example, when a representation of video content is included in group 1, a representation of Japanese dialogue content is included in group 2, and a representation of English dialogue content is included in group 3, the first subset as in FIG. 19 represents a Japanese version of the content (video and Japanese dialogue), and the second subset represents an English version of the content (video and English dialogue).

That is to say, in this case, content combinations of video and dialogue are restricted by subsets. Also, by selecting a subset, the language of the content may be selected. Further, the makeup of the content changes with the selection of the representations from each group specified by the selected subset.

In this way, it may be broadly said that subsets supply application level selections. Also, it may be said that representations supply device (device capabilities) level selections, and representation groups provide content level selections.

CITATION LIST

Patent Literature

PTL 1: Japanese Unexamined Patent Application Publication No. 2005-110244 (Apr. 21, 2005)

SUMMARY OF INVENTION

Technical Problem

According to the aforementioned related art, all representations, representation groups, and subsets are enclosed within one period, and so information representing continuity of these elements within the period is not described.

For this reason, every time a period is changed, it is necessary to parse all representations, representation groups, and subsets included in the post-transition period, and select subsets and so on, which causes a problem in which the processing load is significant when transitioning between periods.

For example, with the MPD in FIG. 19, it is assumed that the client selecting and playing the first subset corresponding to the Japanese version of the content at the period beginning from "PT0S" will normally continue to play the Japanese version of the content during the next period as well (period beginning from "PT30S").

However, in such a case, it is necessary for the client to again perform a selection of subsets, representations and so on after reading and parsing all content for the next period (presentations, representation groups, and subsets), and so the processing load at the client is significant.

This is not limited to the case in which the content is selected by the representations, representation groups, and subsets as this is also a problem that occurs with cases in which content is selected after referencing the description information describing acquirable content in every period (playback period).

The present invention is the result of considering the aforementioned problems with the purpose of providing a playback device or the like in which content may easily be selected depending on the content selected for a certain playback period when transitioning from a certain playback period to the next playback period to be played.

Solution to Problem

In order to resolve the aforementioned problems, a playback device according to the present inventions obtains and plays content selected after referencing content information on that to be selected including information representing acquirable content in each playback period of the content, in which identification information for identifying content to be played at the playback period to be played next corresponding to the content selected at a certain playback period is included in the aforementioned content information on that to be selected, and this playback device includes selection means configured to select content to be played at the aforementioned certain playback period after referencing the aforementioned content information on that to be selected, and at the same time, for selecting content to be played at the playback period to be played next in accordance with the aforementioned identification information, acquisition means configured to acquire the content selected by the aforementioned selection means, and playback means configured to play content acquired by the aforementioned acquisition means at a certain playback period as previously described and to continuously play the content to be played at the playback period to be played next.

Also, in order to resolve the aforementioned problems, a control method for the playback device according to the present invention controls the playback device to obtain and play content selected after referencing content information on that to be selected including information representing acquirable content in each playback period of the content, in which identification information for identifying content to be played at the playback period to be played next corresponding to the content selected at a certain playback period is included in the aforementioned content information on that to be selected, and this control method includes a selection step for selecting content to be played at the aforementioned certain playback period after referencing the aforementioned content information on that to be selected, and at the same time, for selecting content to be played at the playback period to be played next in accordance with the aforementioned identification information, an acquisition step for acquiring the content selected by the aforementioned selection step, and a playback step for playing content acquired by the aforementioned acquisition step at a certain playback period as previously described and for continuously playing the content to be played at the playback period to be played next.

Also, in order to resolve the aforementioned problems, a generating device according to the present invention generates content information on that to be selected including information representing acquirable content per playback period, and this generating device includes identification information generating means configured to generate identification information for identifying content to be played at the playback period to be played next, corresponding to content selected in a certain playback period, and generating means configured to generate the content information on that to be selected including the identification information generated by the aforementioned identification information generating means.

Also, in order to resolve the aforementioned problems, a control method for the generating device according to the present invention controls the generating device to generate content information on that to be selected including information representing acquirable content per playback period, and this control method includes a step for generating identification information for identifying content to be played at the playback period to be played next, corresponding to content selected in a certain playback period, and a step for generating the content information on that to be selected including the identification information generated by the aforementioned step.

Also, in order to resolve the aforementioned problems, a recording medium according to the present invention is a computer-readable recording medium to which the content information on that to be selected including the information representing acquirable content per playback period is recorded, wherein the aforementioned content information on that to be selected includes identification information for identifying the content to be played at the playback period to be played next corresponding to the content selected at a certain playback period, and the playback device references the aforementioned content information on that to be selected, selects the content to be played in a certain playback period, and at the same time, selects the content to be played at the playback period to be played next in accordance with the previously describe identification information.

Also, in order to resolve the aforementioned problems, a data structure according to the present invention is a data structure of the content information to be selected including the information representing acquirable content per playback period, and the data structure includes identification information for identifying content to be played at the playback period to be played next corresponding to the content selected at a certain playback period, wherein the playback device references the aforementioned content information on that to be selected, selects the content to be played in a certain playback period, and at the same time, selects the content to be played at the playback period to be played next in accordance with the previously describe identification information.

Advantageous Effects of Invention

As previously described, the playback device according to the present inventions is configured with selection means configured to select content to be played at a certain playback period after referencing the content information on that to be selected, and at the same time, for selecting content to be played at the playback period to be played next in accordance with the identification information, to identify content to be played in a playing period which is to be played next, acquisition means configured to acquire the content selected by the aforementioned selection means, and playback means configured to for play content acquired by the aforementioned acquisition means at a certain playback period as previously described and for continuously playing the content to be played at the playback period to be played next.

Also, as previously described, the control method of the playback device according to the present invention is configured with a selection step for selecting content to be played at a certain playback period after referencing the content information on that to be selected, and at the same time, for selecting content to be played at the playback period to be played next in accordance with the identification information, to identify content to be played in a playing period which is to be played next, an acquisition step for acquiring the content selected by the aforementioned selection step, and a playback step for playing content acquired by the aforementioned acquisition step at a certain playback period as previously described and for continuously playing the content to be played at the playback period to be played next.

Also, as previously described, the generating device according to the present invention is configured with identification information generating means configured to generate identification information for identifying content to be played at the playback period to be played next, corresponding to content selected in a certain playing period, and generating means configured to generate the content information on that to be selected including the identification information generated by the aforementioned identification information generating means.

Also, as previously described, the control method of the generating device according to the present invention is configured with a step for generating identification information for identifying content to be played at the playback period to be played next, corresponding to content selected in a certain playing period, and a step for generating the content information on that to be selected including the identification information generated by the aforementioned step.

Also, as previously described, the recording medium according to the present invention is configured with the content information on that to be selected includes identification information for identifying the content to be played at the playback period to be played next corresponding to the content selected at a certain playback period, and the playback device references the aforementioned content information on that to be selected, selects the content to be played in a certain playback period, and at the same time, selects the content to be played at the playback period to be played next in accordance with the aforementioned identification information.

Also, as previously described, the data structure according to the present invention is configured with identification information for identifying content to be played at the playback period to be played next corresponding to the content selected at a certain playback period, wherein the playback device references the aforementioned content information on that to be selected, selects the content to be played in a certain playback period, and at the same time, selects the content to be played at the playback period to be played next in accordance with the previously describe identification information.

The aforementioned content information on that to be selected includes identification information identifying the content to be played at the playback period to be played next corresponding to the content selected at a certain period. Therefore, by using this content information on that to be selected, an effect is obtained in which the playback device may select the content to be played in a certain playback period, and at the same time, may readily select the content to be played at the playback period to be played next in accordance with the aforementioned identification information.

BRIEF DESCRIPTION OF DRAWINGS

FIG. 5 is a diagram illustrating an example of an MPD including subsets in which default attributes are described.

FIG. 6 is a diagram illustrating an example of an MPD including a specialized subset representing a representation group included in all subsets.

FIG. 7 is a diagram illustrating an example of an MPD including attributes specifying the next subset.

FIG. 8 is a diagram illustrating an example of an MPD including attributes specifying the previous subset.

FIG. 9 is a flowchart illustrating an example of a processing executed by the aforementioned client when using an MPD including a next attribute.

FIG. 11 is a diagram illustrating an example of an MPD including subsets in which both the next attribute and the previous attribute are described.

FIG. 16 is a diagram illustrating an example of an MPD according to the related art.

FIG. 17 is a diagram illustrating the related art, and is a diagram illustrating an example of MPD data including a group attribute.

FIG. 18 is a diagram illustrating the related art, and is a diagram illustrating an example of MPD data including a representation group element.

FIG. 19 is a diagram illustrating the related art, and is a diagram illustrating an example of MPD data including a subset element.

FIG. 20 is a diagram illustrating an example of an HTML document describing a URL specifying the subset to be played.

FIG. 28 is a diagram illustrating an example of an MPD referencing another MPD.

FIG. 30 is a diagram illustrating an example of an MPD for actualizing a trick play.

DESCRIPTION OF EMBODIMENTS

First Embodiment

Hereafter, a first Embodiment of the present invention will be described in detail with FIG. 1 through 6 as a basis.

[Overview of System]

Figure 1:
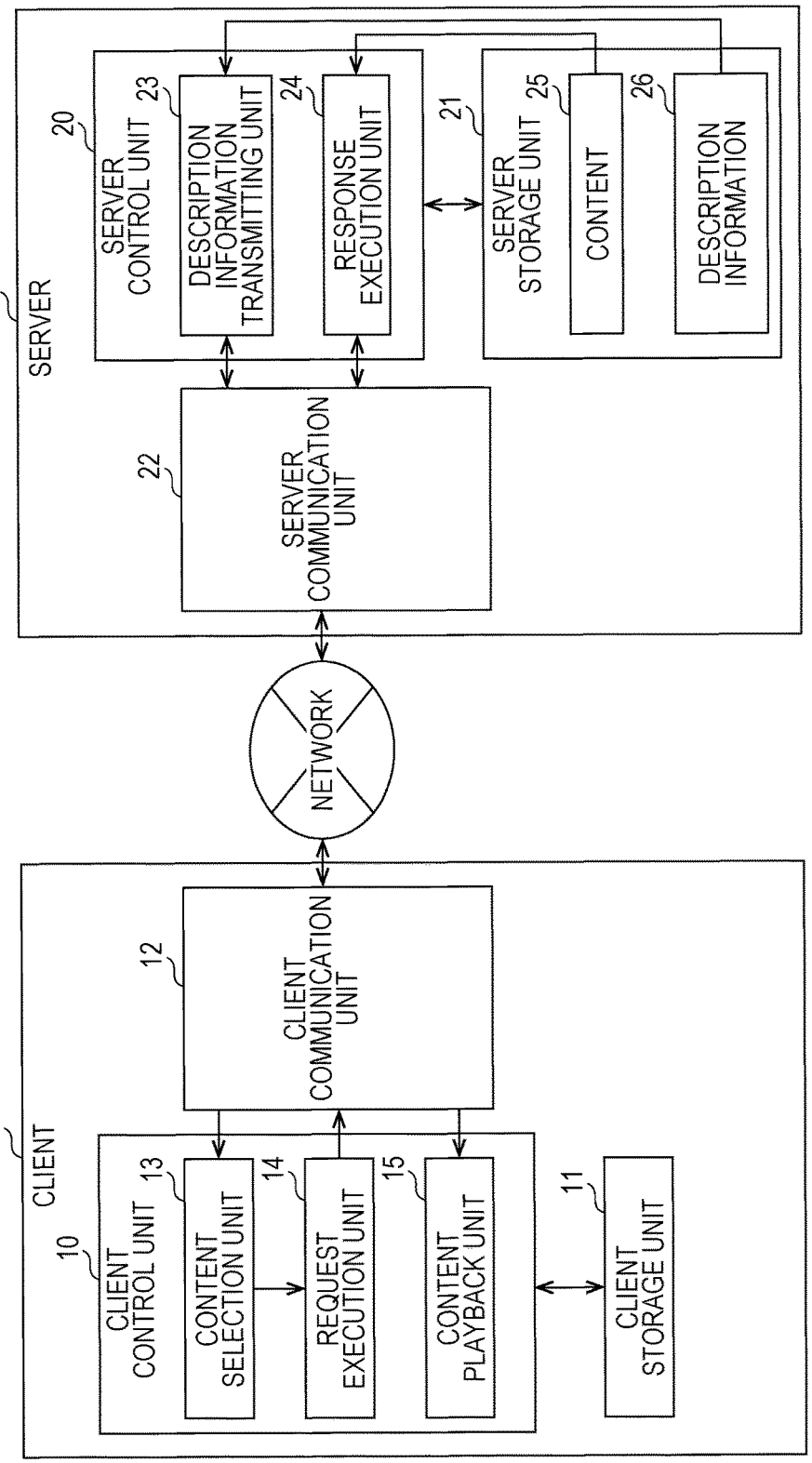
FIG. 1 is a block diagram illustrating a configuration of client and server elements included in a content transmission/reception system related to an embodiment of the present invention.

First, an overview of a content transmission/reception system according to the present embodiment will be described with FIG. 1 as a basis. FIG. 1 represents an embodiment of the present invention and is a block diagram illustrating a configuration of elements for a client (playback device) 1 and a server (generating device) 2 included in a content transmission/reception system 3.

As illustrated, the client 1 is provisioned with a client control unit 10 for organizing and controlling operation of the client 1, a client storage unit 11 for storing data used by the client 1, and a client communication unit (communication unit) 12 for the client 1 to communicate with external devices through a network. The client control unit 10 also includes a content selection unit (selection means) 13, a request execution unit (acquisition means) 14, and a content playback unit (playback means) 15.

The content selection unit 13 acquires description information (content information on that to be selected) of content including information representing acquirable content for each playback period (period), and selects the content to request from the server 2 according to the acquired description information. Specifically, the content selection unit 13 receives an MPD as the description information from the server 2 (content information on that to be selected), and identifies the subset to be selected for the next period by referencing the id (identification information) of the subset (group specification information) described in the MPD. Also, the content to request from the server 2 is selected from the identified subset.

Though details will be described later, the MPD according to the present embodiment includes identification information for identifying content to be played during a playback period for the next of that to be played corresponding to content selected during a certain playback period. The content selection unit 13 may readily select the content for the post-transitioned period by referencing this identification information.

The request execution unit 14 transmits a request requesting the content selected by the content selection unit 13 to the server 2, and so acquires the content from this. Here, the request execution unit 14 transmits the request by HTTP. Further, the example here is described in which content is acquired from the server 2, but may also be acquired from another server.

The content playback unit 15 plays the content received by the request from the request execution unit 14 in order of periods. Further, the played content may be output from displays, speakers, and so on provisioned to the client 1, and may be output from displays, speakers, and so on connected to the client 1 wirelessly or by a wired connection.

Conversely, the server 2 is provisioned with a server control unit 20 for organizing and controlling the operation of the server 2, a server storage unit 21 for storing data used by the server 2, and a server communication unit 22 for the server 2 to communicate with external devices through a network. Also, the server control unit 20 includes a description information transmitting unit 23 and a response execution unit 24, and the server storage unit 21 stores a content 25 and a description information (content information on that to be selected) 26.

The description information transmitting unit (identification information generating means, generating means) 23 transmits the description information to the client 1. Specifically, the description information transmitting unit 23 reads the description information 26 stored in the server storage unit 21, and transmits this to the client 1 via the server communication unit 22. As previously described, an MPD is used here as the description information.

The response execution unit 24 transmits content to the client 1 depending on the request received from the client 1. Specifically, the response execution unit 24 reads the content 25 stored in the server storage unit 21 when the request is received, and transmits this to the client 1 via the server communication unit 22.

The content 25 is the content corresponding to the request from the client 1, and is content such as video data, audio data, character data, and so on, for example.

The description information 26 is information related to the content (here, the content 25 stored in the server storage unit 21) that may be provided to the client 1 from the server 2. Specifically, the description information 26 is an MPD in which the representation (content specification information) representing content which becomes a selection candidate is described in each period, and attributes (codec, bitrate, frame rate, resolution, etc.) of this representation are described in each representation. Details on the MPD will be described later.

Further, either or both of the content 25 and the description information 26 may be recorded in an external recording medium detachably mounted to the server 2, and may be recorded in an external device accessible by the server 2. That is to say, the content 25 and the description information 26 may be stored in a state acquirable by the server 2, and there storage destination is not particularly limited.

Also, the content transmission/reception system is configured by multiple servers 2, and the configuration may include different servers 2 for providing the content 25 and the description information 26.

Also, the server 2 or previously described external device may be provisioned with a content encoding unit configured to encode content, and a description information generating unit configured to generate the description information 26. Also, at least either the content 25 or the description information 26 may be generated in real time by this configuration. The delivery of the content 25 generated in real time is a so-called live delivery.

Further, according to MPEG DASH MPD, a portion of the contents is divided as external data, which may be referenced using xlink. For this reason, when dividing external data for each representation group belonging to the period under analysis, once all of the external data is acquired, it becomes necessary to perform a selection processing.

In order to acquire this external data, communication by the HTTP protocol is used, but communication by the HTTP protocol does not guarantee real time capabilities. For this reason, there is a problem in that as the amount of external data to be acquired increases, there is increased risk that streaming playback will be interrupted due to communication delay of acquiring external data. According to the present invention, this kind of problem may be resolved by using the aforementioned identification information.

[MPD Including Subset Identification Information]

Figure 2:
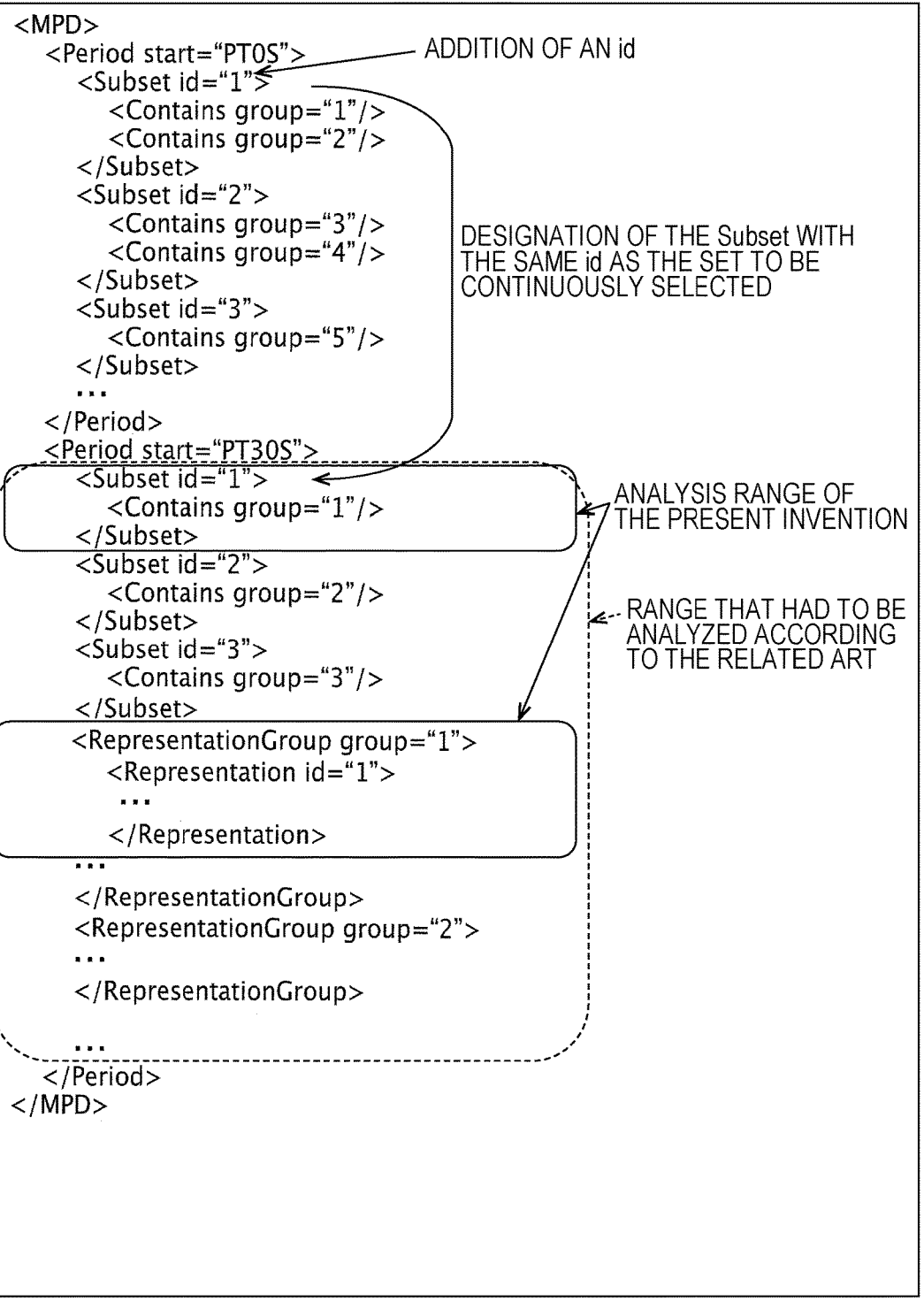
FIG. 2 is a diagram illustrating an example of an MPD including specific information on subsets.

An MPD including subset identification information will be described with FIG. 2 as a basis. FIG. 2 is a diagram illustrating an example of an MPD including subset identification information.

According to the illustrated example, the difference as compared to the MPD according to the related art as in FIG. 19 is that identification information (id) for identifying the subset is added to each subset. This id is added to each subset included in each period, and this enables the subset to be easily selected depending on the subset previously selected when selecting a subset in another period after a subset has been selected in a certain period.

Specifically, a period beginning from "PT0S" (0 second) and a period beginning from "PT30S" (30 second) are described in the MPD in FIG. 2. Three subsets are included in the period beginning from "PT0S". The first subset has an id of 1 and includes a group 1 (hereafter, group="1" will be written in this way, and this applies to other groups as well) and a group 2, the second subset has an id of 2 and includes a group 3 and a group 4, and the third subset has an id of 3 and includes a group 5.

Also, three subsets are included in the period beginning from "PT30S", the first subset has an id of 1 and includes the group 1, the second subset has an id of 2 and includes the group 2, and the third subset has an id of 3 and includes the group 3.

Further, though not illustrated in the same figure, other than the subset elements, representation group elements (content affiliation information) are included in each period as with the example in FIG. 19. Also, the client 1 selects the representation from the representation group depending on the selected subset.

When selecting the representation using this kind of MPD, after performing the selection during a certain period, the client 1 identifies the subset to be selected by referencing the id of the subset when performing the selection of the next period.

For example, when the subset with an id of 1 during the period beginning with "PT0S" is selected, the client 1 also selects the subset with an id of 1 for the continuing period beginning with "PT30S". That is to say, the subsets with the same id value are provisioned with a definition (Semantics) that representing the set that is to be continuously selected.

As a result, the client 1 may only analyze the subset having an id of 1 to select the content during the period beginning with "PT30S", and does not perform an analysis of all subsets as according to the related art. Therefore, the reselection processing load may be significantly reduced when transitioning between periods, as compared to a case when using the MPD according to the related art.

That is to say, when using the MPD according to the related art, the information of the subsets, representation groups, and representations selected at the previous "PT0S" are referenced during the period beginning from "PT30S", as illustrated. Also, using the reference information, the subsets, representation groups, and representations must be reselected on the basis of the information of all subsets, representation groups, and representations, of "PT30S" again. For this reason, the processing load on the client 1 has been significant.

Conversely, when using the MPD as in FIG. 2, the client 1 may perform the selection after referencing only the representation groups and representations included in the subset of the same id as the subset selected for the previous period.

In this way, by refining the information to be referenced, the processing load on the client 1 is reduced. Also, by adding the same id to the subsets that are desired to be continuously selected, the continuity (continuity intended by the creator of the MPD) of content may be reliably maintained when transitioning between periods.

Further, the processing to reference the id of the selected subset and selecting the subset for the next period is applicable to playback in which the advancement of time is reversed such as for fast rewind. For example, when performing playback in an order to return from the period beginning with "PT30S" to the period beginning with "PT0S", the subset with the same id as the subset selected at the period beginning with "PT30S" may be selected at the period starting with "PT0S".

Also, the groups included in the subset with the same id do not have to match regarding each period. Also, the subsets to be continuously selected may be subsets desired to be continuously selected on the content providing side such as the server 2 or the side of the creator of the MPD.

For example, when handling video content, a shared id may be added to subsets corresponding to the Japanese dialogue (subsets specifying video groups and Japanese dialogue groups). Also, a different shared id may be added to subsets corresponding to the English dialogue (subsets specifying video groups and English dialogue groups).

As a result, when subsets corresponding to the Japanese dialogue are initially selected, the subsets selected afterwards may be restricted to the subsets with the same id, and the Japanese dialogue is maintained even as the period is changed. The case when initially selecting the English dialogue is similar. In this way, by specifying the subsets, the content is specified at the application level.

Also for example, advertising (CM) content matching the content selected by the user may be inserted between the periods representing the video content as different periods. In this case, by designating the id of the subset used by the video content and the id of the subsets of the advertising content to the same value, the continuity of content may be maintained as intended by the content provider.

[Processing Flow]

Figure 3:
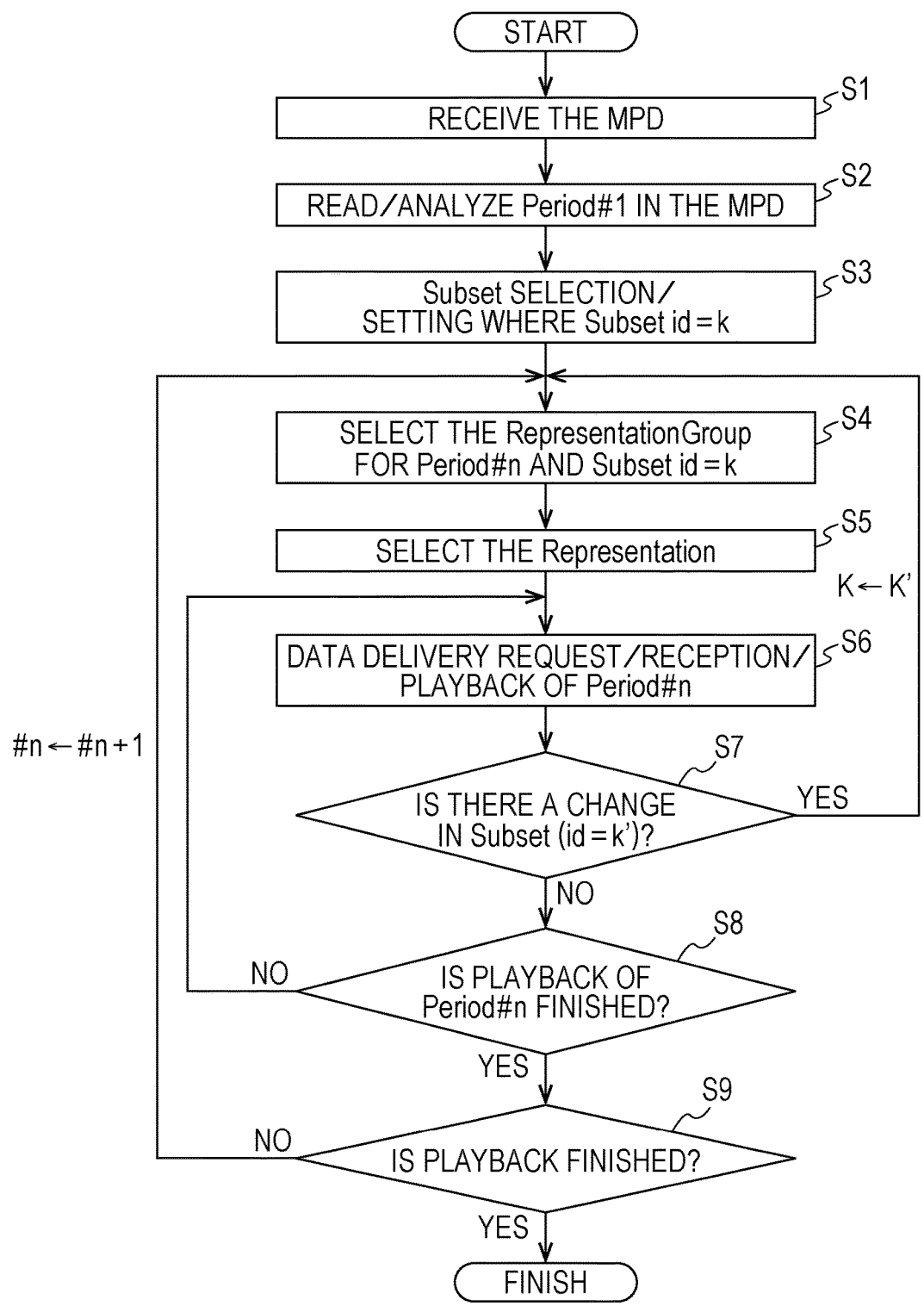
FIG. 3 is a flowchart illustrating an example of a processing executed by the client.

Next, the processing flow executed by the client 1 will be described with FIG. 3 as a basis. FIG. 3 is a flowchart illustrating an example of a processing executed by the client 1.

The content selection unit 13 of the client 1 receives the MPD via the client communication unit 12 (S1). This MPD acquires the description information 26 stored in the server storage unit 21 by the description information transmitting unit 23 in the server 2 as the MPD, and is transmitted to the client 1 via the server communication unit 22 (this may also be a multicast transmission to multiple clients including the client 1).

Further, the method in which the server 2 acquires the MPD is not limited thusly, for example, the MPD recorded in a recording medium external to the server 2 may be acquired, and the MPD may be acquired from another device that generates or stores the MPD. Also, the description information transmitting unit 23 may generate the MPD. Generation of the MPD will be described later.

Next, the content selection unit 13 performs the reading and analysis of the first period (Period#1) in the received MPD (S2). Also, the selection and setting of the subset is performed on the basis of the analyzed MPD (S3). Here, the subset with an id=k is selected. Further, the selection of the subset is performed according to user operation, or is automatically performed by the processing of the content selection unit 13 without user operation.

When in accordance with user operation, the content selection unit 13 may perform processing such as display of an image to enable the selection of the subset. Also, when automatically selected, this is selected according to predetermined criteria and on the basis of the analysis result of S2. For example, the subset with the smallest id value may be selected, of the subset with a previously specified id may be selected.

Next, the content selection unit 13 selects the representation group corresponding to the group specified by the subset with the id=k from the Period#n from the MPD received at S1 (S4). According to the processing of the first S4 after the flow has started, the representation group for Period#1 read at S2 is selected. That is to say, n=1.

Further, as in the case when multiple representation groups are specified for the subset, and only a portion of the specified group is selectable (when all groups specified for the subset do not need to be selected), for example, when there are selections regarding the selection of the representation group, similar to the selection of the subset at S3, this may be selected by the user, or may be automatically selected.

Next, the content selection unit 13 selects the representation from the representation group selected at S4. The selection of the representation is also similar to the selection at S3 and S4, may be selected by the user, or may be automatically selected.

The content selection unit 13 notifies the request execution unit 14 of the selected representation as the content to be played is determined by the selection of the representation. The request execution unit 14 which has received this notification generates the request corresponding to the representation that has been notified. Also, the delivery of the data (content corresponding to the representation) for the representation selected by the content selection unit 13 is requested to the server 2 by transmitting this to the server 2 via the client communication unit 12.

The response execution unit 24 in the server 2 receives this request, reads the requested data (content) from the server storage unit 21, and transmits this to the client 1 via the server communication unit 22. Further, the content to be transmitted may be acquired from the server storage unit 21, or may be acquired from another recording medium or another device. Also, by instructing another device, this may be transmitted to the client 1 from this device.

The content playback unit 15 in the client 1 receives the data (content) requested by the request execution unit 14 via the client communication unit 12, and generates this according to the order of the periods (S6).

Further, the order of the periods is the order of the periods with smaller times as specified by "PT(time)" when performing playback in the ordered direction, and is the order of the periods with larger times when performing playback in the reverse direction. Also, the playback in the ordered direction is playback in the direction of the advancement of time, and corresponds to normal playback, fast forward playback, and so on. Conversely, playback in the reverse direction is playback in the direction as a returning of time, and corresponds to fast rewind playback and so on.

Here, the content selection unit 13 confirms whether or not the subset has changed after the representation selected at S5 is notified to the request execution unit 14 (S7). Here, the changed subset is designated with an id=k'. The changing of the subset may be performed according to user operation, or may be performed automatically.

Also, when it has been confirmed that the subset changed (YES at S7), the processing returns to S4 and the content selection unit 13 selects the representation group from the changed subset, that is to say, the subset with the id=k'.

Conversely, when it has not been confirmed that the subset has changed (NO at S7), the content selection unit 13 confirms whether or not the content playback unit 15 has finished playback of the content of Period#n (S8).

Here, if playback is not finished (NO at (S8)), the processing returns to S6, and the content playback unit 15 continues playback of the content of Period#n. Conversely, when the playback of the content of Period#n is finished (YES at S8), the content selection unit 13 confirms whether or not the content playback unit 15 will finish the playback of content (S9). Further, at S9, when the playback of the content for all periods included in the MPD received at S1 is finished, for example, or when there is user operation to finish the playback of the content, this may be determined as finishing the playback of content.

When it has been confirmed at S9 that playback of content is finishing (YES at S9), the content selection unit 13 finishes the processing. Conversely, when it has been confirmed that the playback of content is not finishing (NO at S9), the processing returns to S4, and the content selection unit 13 selects the representation group for the subset with the id=k from the next period after Period#n, that is to say, Period#n+1 (S4).

As previously described, the content selection unit 13 automatically selects the subset with an id selected at the previous period at the next period. Therefore, when selecting the subset during a break in periods, subsets other than those with the id selected at the previous period may be removed from that which is to be analyzed. For this reason, the processing load on the client 1 is lighter as compared to case when using the MPD according to the related art, which requires all subsets to be analyzed.

Further, according to the aforementioned example, a selection has been performed for the content of the next period at the S4 through S6 after it was confirmed that the playback finishes at S8, but the timing of this selection is not limited to this example, and may be any timing after the processing of S5. Also, the timing to perform the request and reception of the content after the selection may be before the playback of the previous period finishes. The performance of a smooth playback at a break in periods is enabled by performing the selection and request of the next period before the playback of the previous period finishes.

[Skip Playback]

Other than the transition to the next period after the playback of one period finishes, the subset id may also be used during skip playback in which there is a transition to another period before the playback of one period finishes. This will be described with FIG. 4 as a basis.

Figure 4:
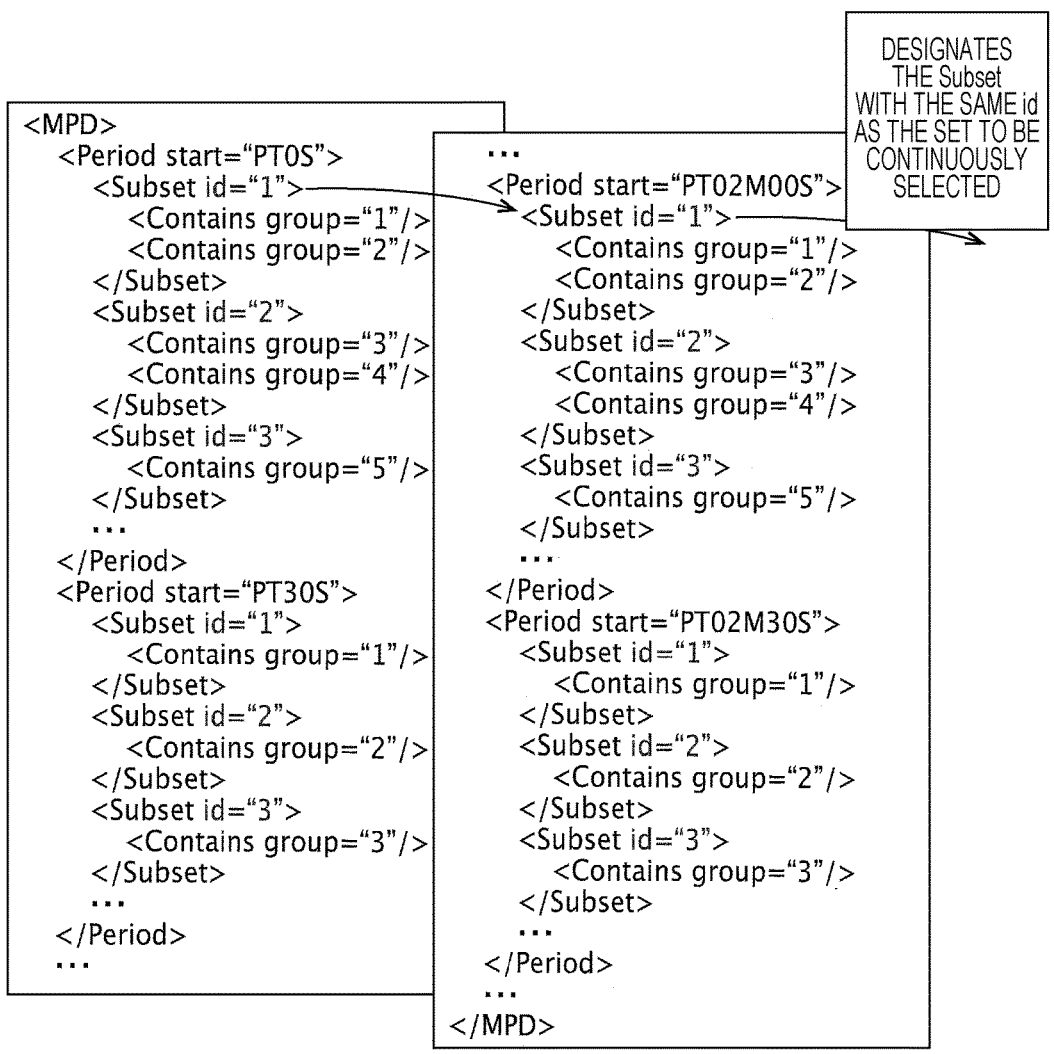
FIG. 4 is a diagram describing a method for selecting the subset by using the subset id during skip playback.

FIG. 4 is a diagram describing a method for selecting a subset using the subset id during skip playback. According to the illustrated example, the subset with an id=1 is selected during the period beginning with "PT0S", and a skip from this period to a period beginning with "PT02M00S" is performed.

The client 1 selects the subset with the same id as the id selected during the previous playback period even when transitioning between periods due to this kind of skip playback. That is to say, as illustrated, the subset with the id=1 is also selected during the period beginning with "PT02M00S".

Therefore, the processing load on the client 1 during skip playback is significantly reduced as compared to an example of the related art in which all subsets included in the period as the skip destination had to be analyzed. Further, other than skip playback, the selection of the subset may be similarly performed using the id for playback such as high speed playback (fast forward), fast rewind, and a summary playback in which an order of only the initial portion of each period is played while skipping.

[Attributes Specifying the Specified Subset]

A configuration may be implemented in which information representing the specified subset is written into the subset attributes for the purpose of readily selecting the subset for the playback start period. This will be described with FIG. 5 as a basis. FIG. 5 is a diagram illustrating an example of an MPD including subsets to which default attributes, which is information representing the specified subset, is written.

The default="true" and default="false" in the same figure are the default attributes (substitute specification information), and the subsets to which the default="true" is added are the specified subsets. Also, the subsets to which the default="false" is added are the subsets which are not specified.

As illustrated in period#3 in the same figure, the default="true" may be added to multiple subsets included in one period. In this case, when selecting the specified subset, one subset is selected from the subsets to which the default="true" is added. Further, according to the example in the same figure, the default="false" is added to all subsets to which the default="true" is not added, but the addition of the default="false" may be omitted.

When there is no specification of the playback start subset externally from user operation, etc., the selection of the appropriate subset and the starting of playback are enabled without performing analysis on other subsets by having these default attributes written. That is to say, when the subset is not specified, the client 1 selects the subsets to which the default="true" is added.

Also, when transitioning periods and there are no ids for the subsets selected at the previous period, a configuration may be implemented in which specified subsets to which the default="true" are added are temporarily selected at the current period, and subsets with the aforementioned id are selected at the next period.

Regarding the example in FIG. 5, for example, when the client 1 selects the subset with an id=3 at the period#1 and starts playback, as there are no subsets with the id=3 in period#2, the specified subset with an id=1 is substituted, and playback continues. Also, at the period#3, there are subsets with the id=3, and so playback continues with the reselection of the subset with the id=3.

By implementing such a configuration, even when subsets with the same id are not included in all periods, the selected subsets are able to have a constant continuity.

For example, let us assume a case in which period#1 and #3 are video content, period#2 is advertising content, and each subset represents selections for dialogue data (id=1: Japanese, id=2: English, and id=3: French). In this case, even if the dialogue data corresponding to all languages has not been prepared for the advertising content to match the video content, the dialogue data for the video content may still be designated with the same language. For example, when the user selects the French dialogue data at the period#1, the advertising content at period#2 has Japanese dialogue, but when returning to the video content at period#3, the playback is performed using the French dialogue data.

[Handling of Representation Groups Included in all Subsets]

Here, there is a rule regarding subsets in MPEG DASH in which representation groups that are not included in any subset are to be included in all subsets. Therefore, when extracting only representation groups clearly specified by subsets, there is no guarantee that all representation groups included in these subsets will be extracted.

For this reason, in order to reliably extract all representation groups includes in subsets, all subsets had to be referenced to confirm whether or not there have been representation groups not included in any of the subsets.

In order to avoid such a cumbersome processing, when representation groups are included in all subsets in the MPD, it is preferable to clearly write their existence. For example, a special subset may be defined to represent representation groups included in all subsets. This will be described with FIG. 6 as a basis.

FIG. 6 is a diagram illustrating an example of an MPD including a special subset representing representation groups included in all subsets. According to the illustrated MPD, a subset with an id=0 (group specification information for essential selection) is added. This subset is a special subset representing representation groups included in all subsets.

That is to say, when the client 1 confirms that the subset with the id=0 is included in the MPD, representation groups included in this subset have to be selected for any period. Further, the client 1 does not select only the subset with the id=0.

Therefore, when the subset with the id=1 is selected at the period beginning with "PT0S" as in the example in FIG. 6, the client 1 selects both the subset with the id=1 and the subset with the id=0 at the continuing period beginning with "PT30S".

In this way, by defining the subset with the id=0, the client 1 only analyzes the subsets with the same id as subsets before transitioning and the Subset with the id=0 when transitioning between periods, and so all representation groups included in subsets may be reliably extracted.

Further, other than defining a special subset, a restriction may be implemented in which representation groups included in subsets have to be clearly defined. As a result, by analyzing only the subsets with the same id as the subsets selected at the previous period, all representation groups included in subsets may be reliably extracted.

Second Embodiment

Next, a second Embodiment of the present invention will be described with FIG. 7 through 15 as a basis. According to the first Embodiment, examples have been illustrated in which subsets with the same id as that with ids previously selected are selected at the next period, but according to the present embodiment, examples are illustrated in which attributes representing continuity between subsets are further added. In addition to the subsets with the same id, the selection of optional subsets specified by these attributes when crossing periods is enabled by adding these attributes. Further, the configuration of the system and the devices (refer to FIG. 1) are the same as that for the first Embodiment.

[Attributes Specifying Subsets to be Selected at the Next Period]

First, attributes specifying subsets to be selected at the next period will be described with FIG. 7 as a basis. FIG. 7 is a diagram illustrating an example of an MPD including attributes specifying subsets to be selected at the next period.

According to the illustrated MPD, similar to the aforementioned embodiment, an id is written for each subset. Also, other than the id, a "next=" " " is written in the subset in the period beginning from "PT0S". This is an attribute specifying the subset to be selected at the next subset. Further, hereafter, this attribute will be referred to as a next attribute.

The next attribute is specified in which the subset to be selected at the period immediately after the period already selected (in the playback time order) is given an id with a format of "(id value)". When the next attribute is included in the subset selected in a certain period, the client 1 selects the subset with the id specified by the next attribute during the period immediately after.

For example, regarding the MPD in FIG. 7, when the subset with the id=1 is selected at the period beginning with "PT0S", the subset with the id=1 is specified by the next attribute included in this subset. For this reason, the client 1 selects the subset with the id=1 during the period continuing from "PT0S" that begins with "PT30S".

Also, multiple subsets may be specified by the next attribute. When multiple subsets are specified, the client 1 selects one subset from the specified subsets. In this case, the range of that to be analyzed in the MPD by the client 1 becomes larger than the case in which only one subset is specified, but this allows some margin in the selection of subsets by the client 1 or the user.

For example, two numbers, 1 and 2, are written for the next attribute in the subset with the id=2 included in the period beginning from "PT0S" in the MPD in FIG. 7. This represents that the subset with the id=1 and the subset with the id=2 are selection candidates during the next period. Therefore, when this subset is selected at the period beginning with "PT0S", the client 1 selects the subset with the id=1 or id=2 at the period beginning with "PT30S".

Also, subsets with ids different from the subsets including this attribute may be specified with the next attribute. When the id specified by the next attribute included in this subset and the id of the subset selected at a certain period are different, the client 1 selects the id specified by the next attribute during the period immediately after.

For example, a subset with an id=4 is specified by the next attribute in the subset with the id=3 included in the period beginning from "PT0S" in the MPD in FIG. 7. Therefore, when this subset is selected at the period beginning from "PT0S", the client 1 selects the subset with the id=4.

Further, regarding the last period included in the MPD, as there are no periods continuing afterwards, the next attribute cannot be written, but the next attribute can be written in all other periods. For example, regarding the example in FIG. 7, when there are periods continuing after the period beginning from "PT30S", the next attribute may be written for the period beginning from "PT30S".

[Attributes Specifying Subsets Selected at the Previous Period]

Next, attributes specifying subsets selected at the previous period will be described with FIG. 8 as a basis. FIG. 8 is a diagram illustrating an example of an MPD including the attributes specifying subsets selected at the previous period.

According to the illustrated MPD, similar to the aforementioned embodiment, an id is written for each subset. Also, other than the id, a "prev=" " " is written in the subset in the period beginning from "PT30S". This is an attribute specifying the subset to be selected at the previous subset. Further, hereafter, this attribute will be referred to as a previous attribute.

The previous attribute is specified in which the subset selected at the period immediately before in the playback time order is given an id with a format of "(id value)". When the previous attribute is included in the subset selected in a certain period, the client 1 selects the subset with the id specified by the previous attribute during the period immediately before.

For example, regarding the MPD in FIG. 8, when the subset with the id=1 is selected at the period beginning from "PT0S", the client 1 references the tag portion of each subset included in the period continuing from "PT0S" that begins from "PT30S", and confirms the id specified by the previous attribute. Also, here, the subset with the id=1 is selected at the period immediately before, and so the subset with the id=1 specified in the subset with the id=1 by the previous attribute is selected.

Further, when using only the previous attribute, regarding playback in the ordered direction, the tag portion of each subset of the next period has to be referenced in this way, and so the processing load is significant as compared to the case in which only the next attribute is used. The case in which playback is performed in the reverse direction using only the next attribute is similar.

In contrast, when performing playback in the reverse direction, subsets may be readily selected by the previous attribute. Similarly, when using only the next attribute, the selection of subsets during playback in the ordered direction is simple. Therefore, by combining the next attribute and the previous attribute, the advantages of both may be exploited, and the disadvantages of both may be compensated for. This will be described later.

Also, multiple subsets may be specified by the previous attribute. When multiple subsets are specified, the client 1 selects one subset from the specified subsets during playback in the reverse direction. Also, the id of subsets selected at the previous period during playback in the ordered direction selects the subset written to the previous attribute included in the specified candidates.

For example, two numbers, 1 and 2, are written for the previous attribute in the subset with the id=1 included in the period beginning from "PT30S" in the MPD in FIG. 8. This represents that either the subset with the id=1 or the subset with the id=2 has to be selected during the previous period.

Therefore, when either the subset with the id=1 or the subset with the id=2 is selected at the period beginning with "PT0S", the client 1 selects the subset with the id=1 at the period beginning from "PT30S" during playback in the ordered direction. Also, for playback in the reverse direction, when this subset is selected at the period starting from "PT30S", the subset with the id=1 or id=2 is selected at the period beginning from "PT0S".

Also, subsets with ids different from the subsets including this attribute may be specified with the previous attribute. When the id specified by the previous attribute included in this subset and the id of the subset selected at a certain period are different, the client 1 selects the id specified by the previous attribute during the period immediately before.

For example, a subset with an id=3 is specified by the previous attribute in the subset with the id=4 included in the period beginning from "PT30S" in the MPD in FIG. 8. Therefore, when the subset with the id=3 is selected at the period beginning from "PT0S", the client 1 selects the subset with the id=4 at the period beginning from "PT30S" for playback in the ordered direction. Also, for playback in the reverse direction, when this subset is selected at the period beginning from "PT30S", the subset with the id=3 is selected at the period beginning from "PT0S".

Further, regarding the first period included in the MPD, as there are no previous periods, the previous attribute cannot be written, but the previous attribute may be written in all other periods.

[Processing Flow]

Next, the processing flow executed by the client 1 will be described with FIG. 9 as a basis. FIG. 9 is a flowchart illustrating an example of a processing executed by the client 1, in a case of using an MPD including a next attribute. Further, here, the processing flow is described when playback in the ordered direction is performed. Also, the processing from S11 to S19 in FIG. 9 is similar to the processing from S1 to S9 in FIG. 3, and so their description is omitted here.

When it has been confirmed that playback of content is finishing at S19 (YES at S19), the content selection unit 13 finishes processing. Conversely, when it is confirmed that playback of content is not finishing (NO at S19), processing proceeds to S20.

As S20, the content selection unit 13 switches the id of the subset selected at the next period after the Period#n, that is to say, the Period#n+1 from the current k to the k' specified by the next attribute, and processing returns to S14. At S14, the representation group specified by the subset with the id=k' is selected during the Period#n+1.

Further, the processing when performing playback in the reverse direction using the MPD including the previous attribute is similar to the example in FIG. 9. In this case, at S20, the id of the subset selected at the period to be selected as the next subset (Period#n−1) is switched to the k' specified by the previous attribute, and processing returns to S14.

Conversely, when performing playback in the reverse direction using the MPD including the next attribute, in S20, the content selection unit 13 references the value of the next attribute for each subset included in the period to be selected as the next subset (Period#n−1). Also, that including the next attribute specified in the subsets selected in the current period (Period#n) from the subsets which have been referenced is selected.

Further, when multiple subsets have become candidates, the user may be allowed to select, or the content selection unit 13 may make the selection in accordance with predetermined conditions and similar. The processing when performing playback in the ordered direction using the MPD including the previous attribute is similar.

[Combining the Next Attribute and the Previous Attribute]

As previously described, it is preferable to coming the next attribute and the previous attribute. Here, an example of combining the next attribute and the previous attribute will be described with FIG. 10 and FIG. 11 as a basis.

Figure 10:
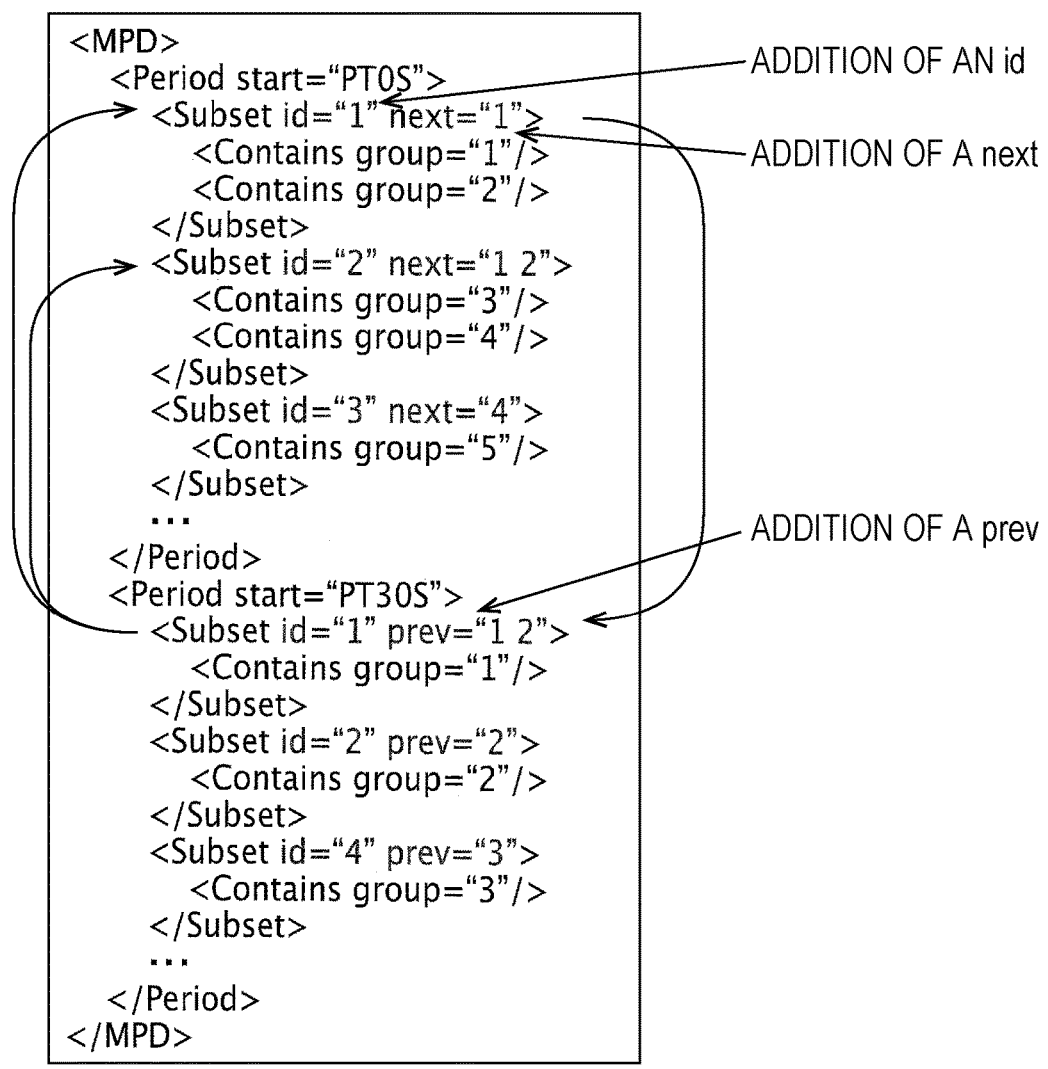
FIG. 10 is a diagram illustrating an example of an MPD including the next attribute and a previous attribute.

FIG. 10 is a diagram illustrating an example of an MPD including the next attribute and the previous attribute. According the illustrated example, the next attribute is written in the subsets with ids=1 through 3 included in the period beginning from "PT0S", and the previous attribute is written in the subsets with ids=1 and 2 included in the period beginning from "PT30S".

In this way, when using the MPD combining the next attribute and the previous attribute, the client 1 may readily select the subset for the period after transitioning by referencing the next attribute during playback in the ordered direction. Also, for playback in the reverse direction, the subset may be readily selected for the period after transitioning by referencing the previous attribute.

Therefore, whether transitioning between period during playback in the ordered direction, or transitioning between periods during playback in the reverse direction, the processing load on the client 1 is lessened. For this reason, fast forward, fast rewind, high-speed skip playback in the ordered direction or the reverse direction may be performed efficiently and smoothly.

Further, when writing such an MPD, it is preferable that the subsets specified by the next attribute and the previous attribute do not contradict each other. A skip playback method for a case of using the next attribute and the previous attribute will be described later.

Here, the example in FIG. 10 illustrates that either the next attribute or the previous attribute is written to one subset, but regarding an MPD including more at least three periods, both the next attribute and the previous attribute may be written to one subset.

FIG. 11 is a diagram illustrating an example of an MPD including subsets to which both the next attribute and the previous attribute are written. According to the illustrated example, the next attribute is written to the subsets with ids=1 to 3 included in the period beginning from "PT0S". Also, both the previous attribute and the next attribute are written to the subsets with ids=1, 2, and 4 included in the period beginning from "PT30S" and to subsets with ids=1, 2, and 4 in the period beginning from PT01M00S".

When using such an MPD, the client 1 references the next attribute during playback in the ordered direction, and selects the subset during the period immediately after. For example, when performing playback in the ordered direction, and the subset with the id=1 is selected at the period beginning from "PT0S", the subset is selected for each period according to the next attribute as illustrated. Conversely, for playback in the reverse direction, the previous attribute is referenced, and the subset is selected for the period immediately before.

For example, when the subset with the id=1 is selected at the period beginning from "PT30S", the client 1 references the next attribute in the subset and selects the identified subset with the id=1 when transitioning between periods during the performance of playback in the ordered direction. Conversely, when performing playback in the reverse direction, the previous attribute is reference in this subset, and the identified subset with the id=1 is selected when transitioning between periods.

[Skip Playback]

When performing skip playback, the periods as skip destinations are not limited to those neighboring the current period on a timeline. According to the example described for the first Embodiment in which the subsets with the same id are selected, subsets with the same id are selected even if the period as the skip destination does not neighbor the current period on a timeline. However, the processing of the case when using the next attribute or the previous attribute according to the present embodiment is different. Here, the processing in the case when the period as the skip destination does not neighbor the current period will be described with FIG. 12 as a basis.

Figure 12:
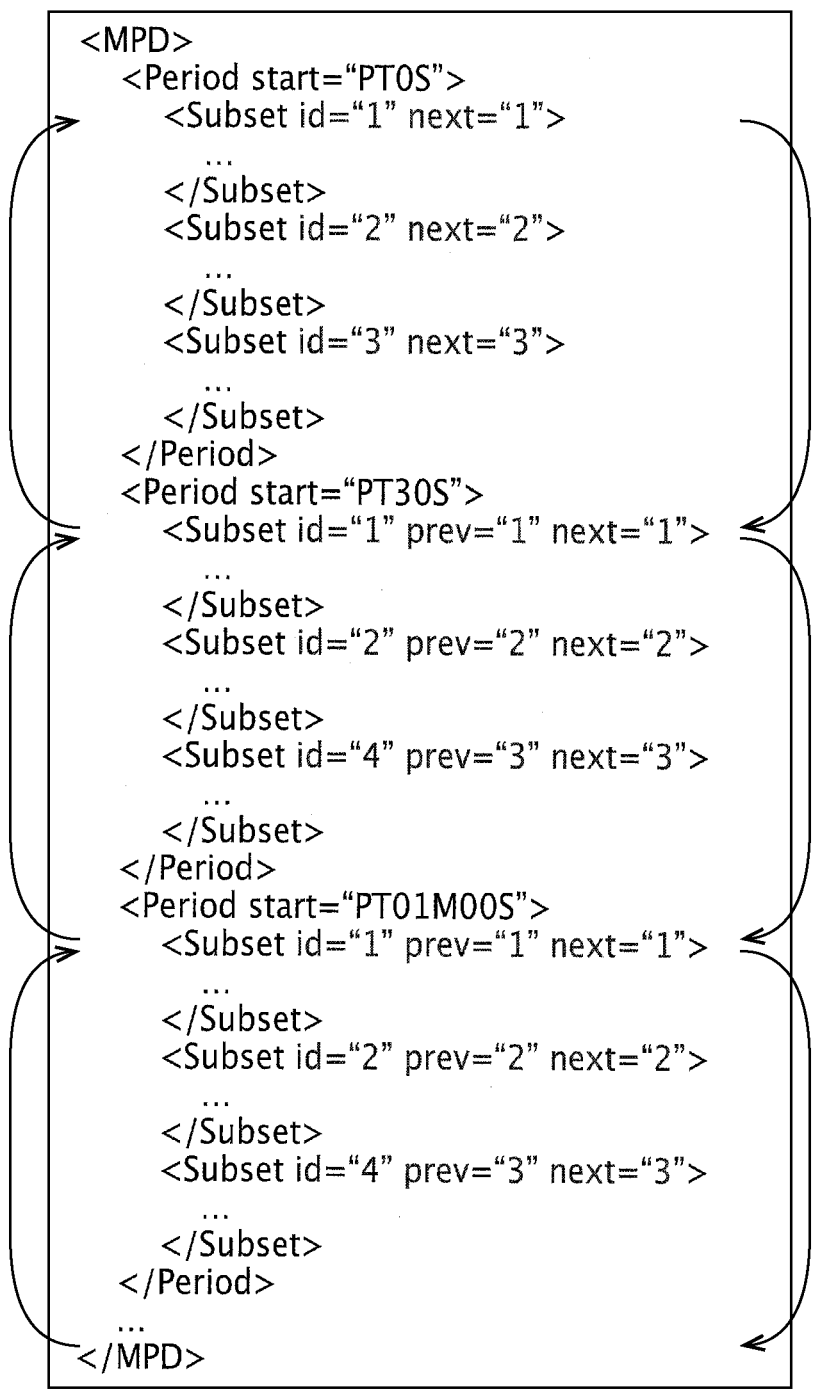
FIG. 12 is a diagram describing a method for selecting a subset in a period as the skip destination when the period as the skip destination is not contiguous with the current period.

FIG. 12 is a diagram describing a method for selecting subsets for the period as the skip destination when the period as the skip destination does not neighbor the current period. Further, the MPD written in the figure is the same as the MPD in FIG. 11.

When performing a skipping to periods that do not neighbor the current period, that is to say, periods that are not immediately before or immediately after the current period, the subset to be selected is identified for the period as the skip destination by the following the order of the values of the next attribute or the previous attribute. This is because the next attribute is that specifying the subset to be selected at the period immediately after regarding playback time, and the previous attribute is that specifying the subset to be selected at the period immediately before regarding playback time.

For example, with the example in FIG. 12, let us assume a case in which after the subset with the id=1 is selected at the period beginning from "PT0S", playback is skipped to the period beginning from "PT01M00S" until the playback for the period beginning from "PT0S" finishes.

In this case, the client 1 identifies from the next attribute included in the subset with the id=1 selected for the period beginning from "PT0S" that the subset to be selected at the period immediately after this period (period beginning from "PT30S") is the subset with the id=1.

Also, it is identified from the next attribute included in the subset with the id=1 for the period beginning from "PT30S" that the subset to be selected at the period immediately after this period (period beginning from "PT01M00S") is the subset with the id=1. As a result, it may be identified that the subset with the id=1 should be selected at the period beginning from "PT01M00S", which is the skip destination.

Skipping in the reverse direction is similar in that the subset to be selected for the period as the skip destination may be identified by following the values of the ids specified by the previous attribute from the period as the skip origination to the period as the skip destination.

[Example of Writing the Next Attribute or the Previous Attribute Only in Necessary Portions]

According to the aforementioned examples, the examples illustrated that the next attribute or the previous attribute are written even when specifying subsets with the same id as the id of the subset. However, the next attribute and the previous attribute may only be used when specifying subsets with ids that are different from the id of the subset or when there are multiple selections.

As a result, the subset to be specified may be changed by a simple processing in which the next attribute or the previous attribute are added to portions where it is desired to change the specification. This will be described with FIG. 13 and FIG. 14 as a basis.

Figure 13:
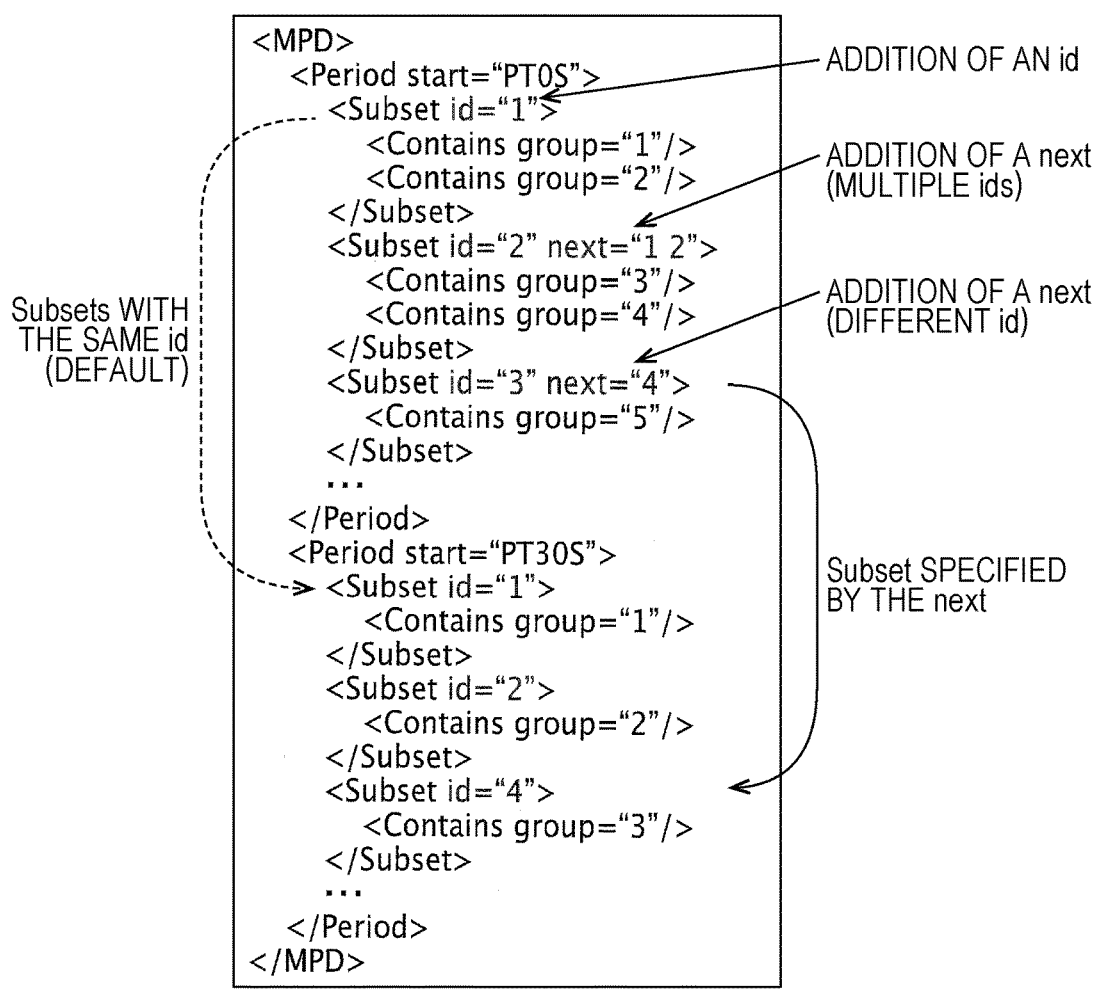
FIG. 13 is a diagram illustrating an example of an MPD describing the next attribute only when specifying the id of a subset different from the subset id and when there are multiple selections.

FIG. 13 is a diagram illustrating an example of an MPD to which the next attribute is only written when specifying subsets with ids different from the id of the subset, and when there are multiple selections. According to the illustrated example, the subsets with ids=1 through 3 are included in the period beginning from "PT0S". The next attribute is not written to the subset with the id=1 from this group. In contrast, the next attribute specifying the subset with the id=1 or id=2 is written to the subset with the id=2, and the next attribute specifying the subset with the id=4 is written to the subset with the id=3.

In this way, when using an MPD including subsets to which the next attribute is written and subsets to which they are not written, a definition is provisioned (Semantics) in which the subsets with the same id are continuously selected, and this becomes the default.

Therefore, when using the MPD in FIG. 13, the client 1 selects the subset with the same id (id=1) at the next period in accordance with the defaults when the subset with the id=1 is selected at the period beginning from "PT0S". Further, the next period may be the period immediately after (period beginning from "PT30S"), or may be a period that does not neighbor on a timeline (during skip playback, for example).

Also, when the subset with the id=2 is selected for the period beginning from "PT0S", the subset with the id=1 or the id=2 is selected at the period immediately after (period beginning from "PT30S") in accordance with the next attribute written in this subset.

Also, when the subset with the id=3 is selected for the period beginning from "PT0S", the subset with the id=4 is selected at the next period (period beginning from "PT30S") in accordance with the next attribute written in this subset.

Figure 14:
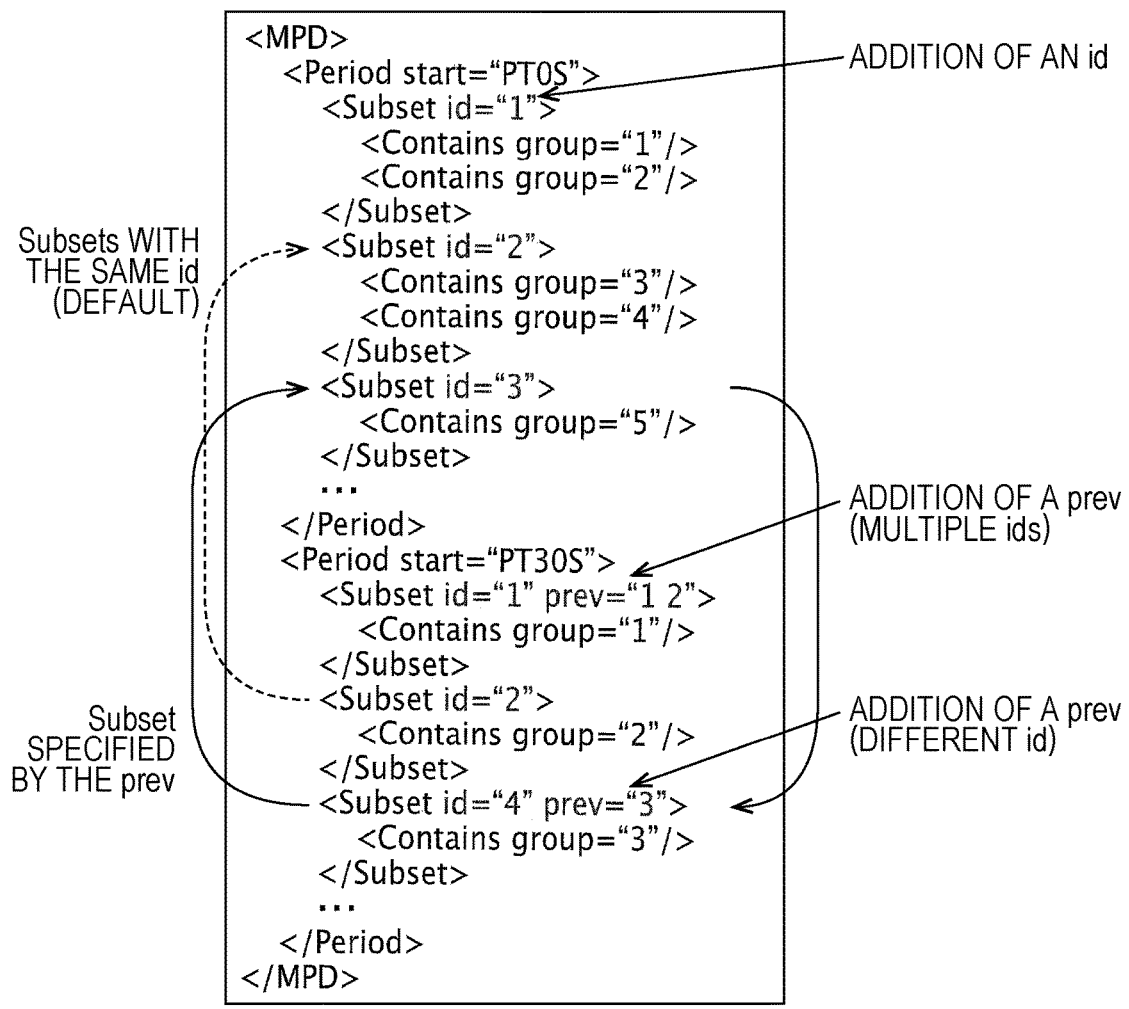
FIG. 14 is a diagram illustrating an example of an MPD describing the previous attribute only when specifying the id of a subset different from the subset id and when there are multiple selections.

Conversely, FIG. 14 is a diagram illustrating an example of an MPD in which the previous attribute is written only when specifying subset with ids different from the id of the subset, and when there are multiple selections. According to the illustrated example, the subsets with ids=1, 2, and 4 are included in the period beginning from "PT30S". The previous attribute is not written into the subset with the id=2 from this group. In contrast, the previous attribute specifying the subsets with the id=1 or id=2 is written into the subset with the id=1, and the previous attribute specifying the subset with the id=3 is written into the subset with the id=4. When using such an MPD, the continuous selection of subsets with the same id values becomes the default.

Therefore, when performing playback in the reverse direction using the MPD in FIG. 14, the client 1 selects the subset with the same id (id=2) at the next period (period beginning from "PT0S") in accordance with the defaults when the subset with the id=2 is selected for the period beginning from "PT30S".

Also, when the subset with the id=1 is selected for the period beginning from "PT30S", the subset with the id=1 or id=2 is selected at the next period (period beginning from "PT0S") in accordance with the previous attribute written in this subset.

Also, when the subset with the id=4 is selected for the period beginning from "PT30S", the subset with the id=3 is selected for the next period (period beginning from "PT0S") in accordance with the previous attribute written in this subset.

Third Embodiment

According the aforementioned embodiments, examples have been described in which the selection of subsets when transitioning between periods is simple by adding the id attribute to the subset, or adding the next attribute or the previous attribute, and referencing the values of such attributes. According to the present embodiment, examples will be described in which the selection of representation groups and representations is simple by similar attributes. Further, the configuration of the system and devices (refer to FIG. 1) is the same of that for the first Embodiment.

[Example Using the Id According to the Related Art]

With the MPD according to the related art, the id attribute may be written into the representation group. Therefore, the representation group to be selected may also be identified at the period after transitioning by referencing the id of the representation group in the way the subset to be selected at the period after transitioning is identified by referencing the id of the subset regarding the aforementioned embodiments.

That is to say, the client 1 may select the representation group with the same id as the representation group selected for a certain period at the next period.

For example, when performing a selection of content using the MPD according to the related art as in FIG. 18, the client 1 may select the representation group with "1" for the next period when the representation group with "1" has been selected for the period beginning from "PT30S".

Also for example, when the representation group with "1" and "2" is selected for the period beginning from "PT30S", the client 1 may select the representation group with "1 and "2" for the next period. Further, as ultimately at least one content may be selected, when selecting multiple representation groups in this way, it does not matter if a content is not selected from the group of selected representation groups.

As a result, the client 1 may readily select the representation group to be selected when transitioning between periods, and at the same time, maintain continuity at the content level. However, regarding content to be played continuously, the representation groups included in this content have to share the same id.

Similarly, with the MPD according to the related art, the id attribute may be written into the representation, and so the representation to be selected may also be identified at the period after transitioning by referencing the id of the representation.

That is to say, the client 1 may select the representation with the same id as the representation selected for a certain period at the next period.

As a result, the processing load on the client 1 from selecting representations may be reduced, and at the same time, continuity at the device (device performance) level may be maintained. For example, regarding content at the same device level (bit rate, resolution, etc.), the ids of the representations corresponding to this content have to be shared. As a result, the client 1 identifies the content to be selected when transitioning between periods by only referencing the ids of representations, and may readily select the content at the same device level after transitioning periods.

However, according to the related art, there is no restriction to write the same id for the same content (content to be continuously played) at the representation group level or the representation level. Also, when advertising or other content has been inserted into a certain content, as the creator that wrote the id is different for each content, it is even less likely that the same id is written for the same content (content to be continuously played).

For this reason, even if a representation group id or a representation id is written in the MPD according to the related art, most cases of referencing such ids when transitioning between periods had no effect on the selection of suitable content.

That is to say, the id for the representation group and the representation in the MPD according to the related art may not be said to represent continuity of representation groups and representations when transitioning between periods.

In contrast, the MPD described here is created under a restriction in which the same id is added to representation groups to be selected continuously, and the same id is added to representations to be played continuously. According to such an MPD, the id for the representation and representation group functions as information representing continuity for representations and representation groups when transitioning between periods.

For example, let us assume a case in which it is desirable to have the server 2 insert advertising content into one content made up of multiple periods (referred to as content A) to be played by the client 1. In such a case, the server 2 may generate an MPD in which the same id as the id of the representation groups in the content A is written for the representation groups of the advertising content for the period in which it is desired to insert the advertising content, and transmit this to the client 1. As a result, may cause the client 1 to play the content A with the advertising content inserted in a desired period.

Further, when using multiple MPDs created under the restriction in which the same id is added to content to be played continuously, the representation group with the same as id as the id selected at the period of the MPD before being changed may be selected when playback continues after switching to another MPD during playback based on a certain MPD. This is similar for subsets and representations as well.

[Example of Adding New Information]

The processing load on the client 1 may be reduced, and at the same time, continuity of representation groups and representation may be maintained when transitioning between periods also by newly adding information representing representation groups or representations to be selected at the next period into the MPD.

For example, identification information for identifying representation groups to be selected at the next period may be written as an attribute that is different from the representation group id. Also, this identification information may be that which specifies the id of the representation group to be selected at the next period.

Also, this identification information may be that which specifies the representation group to be selected for optional periods including periods not continuing on a timeline, which is that other than immediately before or immediately after the current period, as that to be played next. Also, as with the next attribute and the previous attribute, this may specify the representation group to be selected for the period immediately after or immediately before.

When performing a selection using an MPD including such identification information, the client 1 reads out the identification information from the attributes of the representation group selected at the current period. Also, the representation group identified by the identification information readout is selected for the period after transitioning.

This is also similar for representations in that identification information for identifying the representation to be selected at the next period may be written as an attribute, in addition to the representation id.

When performing a selection using an MPD including such identification information, the client 1 reads out the identification information from the attributes of the representation selected at the current period. Also, the representation identified by the identification information readout is selected for the period after transitioning.

[Order of Priority]

As previously described, other than subsets, representation groups and representations may also be specified as that which is to be selected at the period after transitioning. Also, these specifications may be combined. That is to say, at least two of the subsets, representation groups, and the representations may be specified.

Here, after the subset is determined, the representation groups which may be selected become limited, and so this may be said to be a layer above the representation group. Also, the representation group includes the representations, and so it may be said that this layer is also above the representations.

When performing a specification of multiple layers having such vertical relationships, it is desirable to previously set an order of priority so that no contradictions develop in selections at each layer. Here, the order of priority for selections at each layer will be described with FIG. 15 as a basis.

Figure 15:
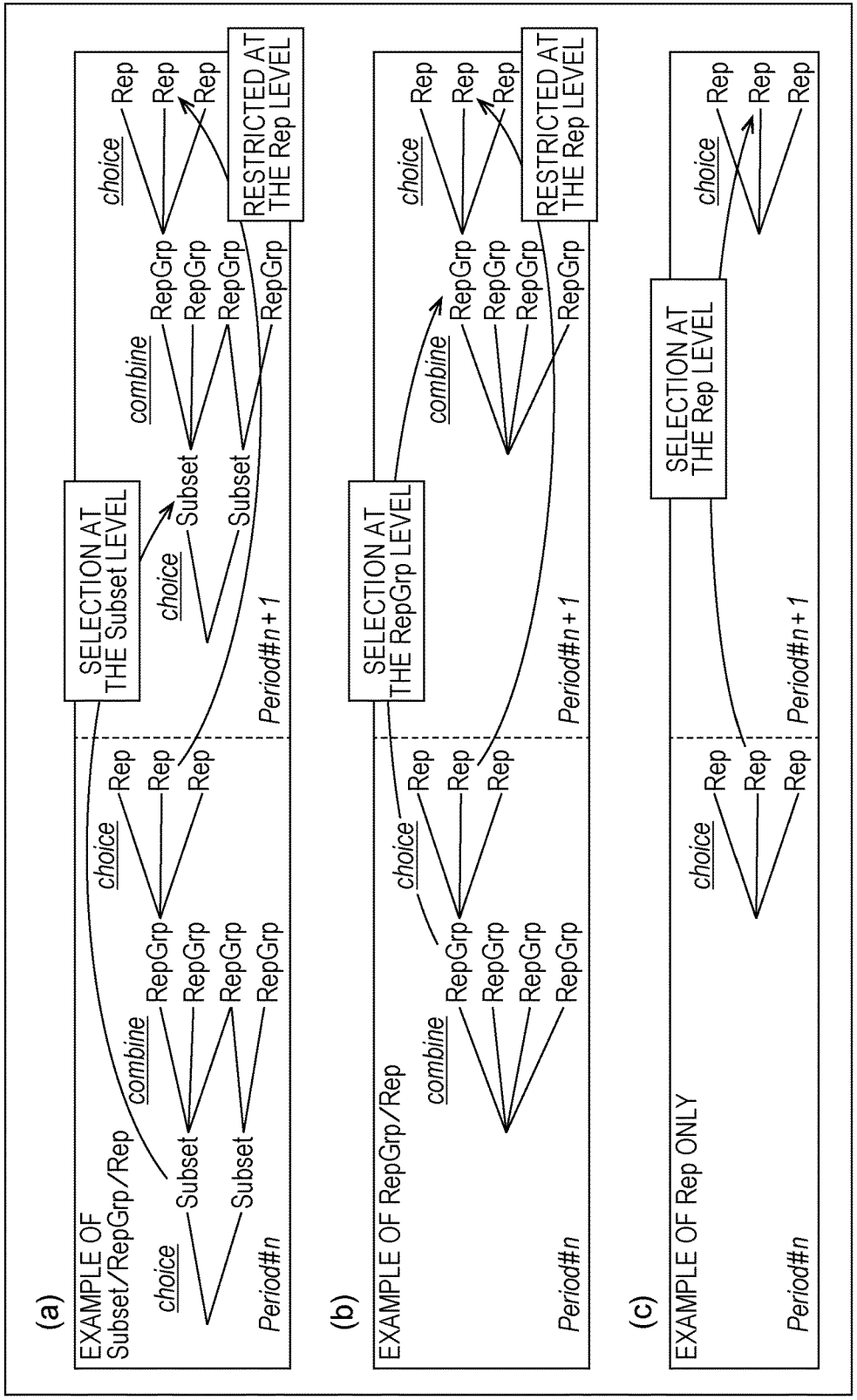
FIG. 15 is a diagram describing a priority order of selections in three hierarchies, which are subsets, representation groups, and representations, (a) of the same figure illustrates a case when all three hierarchies are referenced to perform a selection, (b) of the same figure illustrates a case when two hierarchies are referenced excluding the subset hierarchy to perform a selection, and (c) of the same figure illustrates a case when only the representation hierarchy is referenced to perform a selection.

FIG. 15 is a diagram describing the order of priority for selections at three layers, which are the subsets, the representation groups, and the representations, and (a) of the same figure illustrates when referencing all three layers, (b) of the same figure illustrates when referencing two layers without the subset layer, and (c) of the same illustrates when referencing only the representation layer. Further, the subsets are labeled as Subset, the representation groups are labeled as RepGrp, and the representations are labeled as Rep in FIG. 15.

When referencing the selections for all three layers for the period before transitioning and performing a selection for the period after transitioning, the order of priority is in an order from subsets>representation groups>representations. Specifically, as illustrated in (a) of the same figure, the client 1 first selects the subset with the same id as the subset selected at the period (period#n) before transitioning (or another subset specified in this subset) for the next subset (period#n+1) as well.

Next, the client 1 selects the representation with the same id as the representation selected at the period before transitioning (or another representation specified in this representation). However, when the representation selected at the period before transitioning is not included in the previously selected subset, another representation that is included in this subset is selected.

That is to say, the subset for the next period is selected in accordance with the id of the subset selected at the previous period, and the representations included in the selected subset are filtered in accordance with the ids of the representations selected at the previous period.

Further, the function of the subsets is to enable the selection of representation groups (a group of) as a single unit, and the selection of subsets is functionally the same as selections in units of representation groups. Therefore, when the aforementioned orders of priority are put together, the selection which may be performed according to the continuity at the representation group level is only the case such in (b) of the same figure in which the subsets are not selected.

According to (b) of the same figure, selection of subsets at the period after transitioning on the basis of the subset selected at the period before transitioning is not performed. According to this example, the representation group with the same id as the representation group selected at the period before transitioning (or another representation group specified in this representation group) is selected.

Also, the representation with the same id as the representation selected at the period before transitioning (or another representation specified by this representation) is selected. However, when the representation selected at the period before transitioning is not included in the representation group previously selected, another representation included in this representation group is selected.

That is to say, the selection according to the continuity at the representation level is performed for further filtering within a range so that there are no contradictions in selections at the subset and the representation group level.

Also, as illustrated in (c) in the same figure, when the selection is not performed on the basis of the subsets and the representation groups selected at the period before transitioning, the client 1 selects the representation with the same id as the representation selected at the period before transitioning (or another representation specified in this representation).

In this way, when performing a selection on the basis of only the representation selected at the period before transitioning, the representation is selected regardless of the subsets and representation groups selected at the period before transitioning.

Therefore, the selection of the representation in this case is the selection by conditions narrower than that for the subsets and representation groups. That is to say, even when the subset and the representation group is determined, there are cases when the client 1 does not determine the content to be played, but if the representation is determined, the content to be played by the client 1 is certainly determined.

For this reason, regarding a case such as clearly specifying the representation to be selected at the next period by the next attribute or the previous attribute, the client 1 may perform a selection of the representation, as that with the highest priority, selected at the period before transitioning for the period after transitioning.

However, in this case, the all ids of the representations have to be different (one representation corresponding to one specified id is uniquely determined). Also, in this case, the creator of the MPD has to design the MPD so that there are no contradictions between the selections at the representation level and the selections at the subset and representation group level.

[MPD Generation by the Server 2]

The MPDs used regarding the aforementioned embodiments may be generated by the description information transmitting unit 23 in the server 2. Here, the processing to generate the MPD by the description information transmitting unit 23 will be described.

For example, for an MPD such as that illustrated in FIG. 2, in contrast to the MPD according to the related art in which the attributes representing subset ids are not included, the description information transmitting unit 23 may generate by adding attributes representing subset ids.

In this case, the description information transmitting unit 23 may determine the id of each subset so that the subsets to be continuously selected have the same id regarding the subsets included in each period. The description information transmitting unit 23 may write the same id in the subsets forming a combination of the same groups. For example, an id=1 may be written to the subset including groups "1" and "2", and may write an id=2 to the subset including groups "3" and "4".

Also, the description information transmitting unit 23 writes the same id to the subsets desired to be selected continuously even for different combinations of groups. For example, the same id is written to advertising content or other to be inserted and played immediately before, immediately after, or during a main content such as video.

In this way, the description information transmitting unit 23 determines the identification information (id) for identifying content to be played at the period of that to be played next corresponding to the content selected at a certain period.

However, as such situations as the usage language switching during playback of content (for example, switching the dialogue from Japanese to English) are not desirable, the description information transmitting unit 23 writes the same id to subsets representing the combination of groups satisfying predetermined conditions.

Other than sharing the usage language, for example, that which may be applied as these conditions are optional parameters such as the sharing of playback forms of content (for example, 2D displays and 3D displays). Further, the usage language and playback forms may be identified by referencing attributes or other included in the representation.

The id written in each subset may be automatically determined by the description information transmitting unit 23, or may be determined by the user of the server 2. When determined by the user, an input unit to receive user operation is provisioned to the server 2, and the description information transmitting unit 23 writes the subset id in accordance with the user operation received by this input unit.

Also, the processing for writing the same id to the subsets forming the combination of the same groups may be automatically performed by the description information transmitting unit 23, or the portions to which the same id is to written regarding different combinations of groups may be written according to user operation.

Further, when selecting the representation groups and the representation at the period after transitioning on the basis of the id of the representation group and the representation selected at the period before transitioning, the description information transmitting unit 23 shares the id of the representation groups and the representations to be continuously played when transitioning between periods.

Similar to the case when writing the id to the subset, in this case as well, the description information transmitting unit 23 automatically determines the id and may generate the MPD to which the determined ids are written by a method in which the same ids are written only when predetermined conditions are satisfied.

As the conditions when determining the id of representation groups, for example, conditions including the representations with the same id may be used. Also, as the conditions when determined the representation ids, for example, conditions in which playback quality are the shared representations (representations which at least one parameter determining playback quality such as resolution or bit rate is the same) may be used.

Also, the description information transmitting unit 23 may write, automatically or in accordance with user operation, information representing the continuity of subsets, representation groups, and representations, such as the next attribute and the previous attribute. As an example of writing this automatically, when it is understood that there are multiple candidates in the subsets to be played continuously, for example, the known, multiple candidates may be combined by the next attribute or the previous attribute.

Further, the description information transmitting unit 23 may add the subset with the id=0 when generating the MPD by modifying the MPD according to the related art in which groups included in all subsets are not clearly defined. Specifically, the description information transmitting unit 23 confirms whether or not there are groups not included in any of the subsets, and when these exist, the subset with the id=0 specifying these groups is added. Also, instead of adding the subset with the id=0, the description information transmitting unit 23 may add the groups not included in any subset to all subsets.

Further, the device for generating the MPD is not limited to the server 2, and so a device different from the server 2 may perform the generation. In this case, the information generated by this device may be transmitted to the client 1 through the server 2, or may be transmitted to the client 1 directly from this device. Further, a recording medium for recording the information generated by this device is provided to the client 1, and the client 1 may read out the information from this recording medium.

Fourth Embodiment

According to the aforementioned embodiments, subsets to be played continuously may be uniquely identified by adding a shared id to the subsets belonging to each period, and so this enabled the simplification of the processing to analyze the MPD. In this way, by specifying the subsets to be played, or by restricting that which is to be analyzed in the MPD, the analysis range of the MPD may be filtered, and the processing to analyze the MPD may be simplified.

According to the present embodiment, an example in which the range of that to be analyzed in the MPD is restricted by an external performance of specifying that to be played, in which this enables the simplification of the processing to analyze the MPD is described with FIG. 20 through FIG. 27 as a basis. Further, the configuration of the system and devices is the same as that for the first Embodiment (refer to FIG. 1).

As a method for specifying that to be played externally, an example could be thought of in which information identifying that to be played is written to a file such as a web page that can be viewed by the client 1. In this case, the client 1 references this information, and acquires and plays that to be played as identified from the server 2. Further, the information identifying that to be played can be said to be information for identifying the analysis range of the MPD.

In the case of such a configuration, as in the example in FIG. 20, for example, the information for identifying that to be played may be written in an HTML document. FIG. 20 is a diagram illustrating an example of an HTML document to which a URL (analysis range identification information) specifying the subset to be played is written.

According to the example in FIG. 20, three URLs, http://example.com/content1.mpd#id=s1, http://example.com/content1.mpd#id=s2, and http://example.com/content1.mpd#id=sn, are written. These are video object URLs to be played by the client 1.

The shared part of these URLs, "http://example.com/content1.mpd", represents the MPD to be played. Also, information identifying that to be played in this MPD is written after the pound sign. Specifically, the id of the subset to be played (analysis range specification information) is written in the format of "id="id attribute value of that to be played"".

That is to say, according to the illustrated URLs, the subsets with ids=s1, s2, and sn are specified in order from the top. In this way, by differentiating the specified subsets, the content to be played also has different contents as discussed regarding the differences between dialogue languages, camera angles, etc., for example. That is to say, the creator who created the content to have multiple playable patterns may present pattern selections to the user before starting the playback of content by creating URLS as previously described beforehand.

This kind of HTML document may be created together with the content and the MPD by the creator of the content, for example. Also, these HTML documents have to be made publicly available to enable the client 1 to view them. For example, when the client 1 accesses this HTML document, a menu screen including selection items (images such as icons and so on) corresponding to each URL or the text of each URL may be displayed to enable the user of the client 1 to select each URL included in this HTML document. As a result, the user may readily select the content according to the desired playback pattern. Further, the client 1 is provisioned with an input unit to receive user operation such as that previously described.

Figure 21:
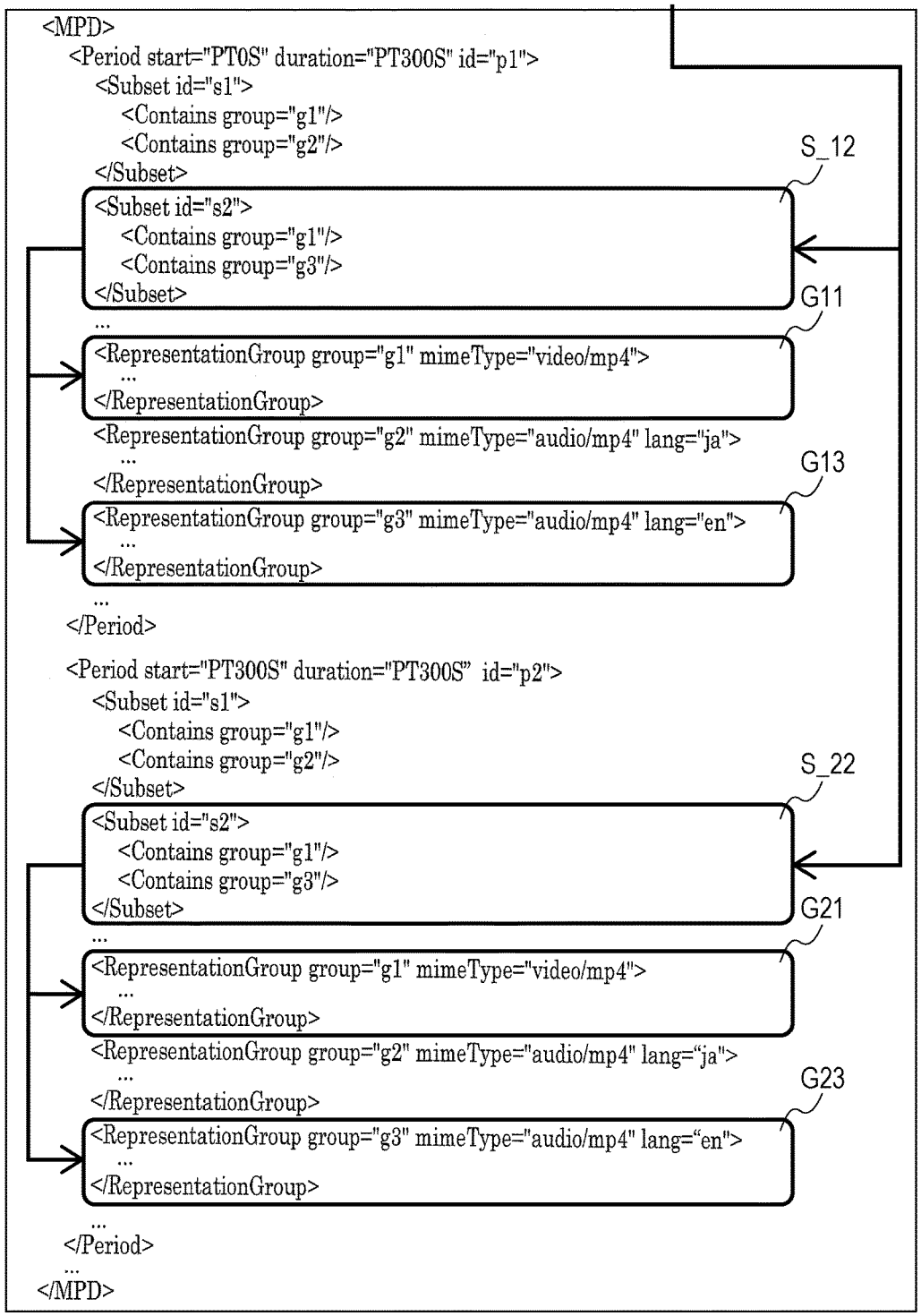
FIG. 21 is a diagram illustrating a relationship between a selected URL and an MPD parsing range specified from this URL.

Next, the processing when a URL included in the aforementioned HTML document is selected will be described with FIG. 21 as a basis. FIG. 21 is a diagram illustrating a relationship between a selected URL and the analysis range of the MPD identified from this URL.

As illustrated, the selected URL is "http://example.com/content1.mpd#id=s2", and this is the second URL from the top in FIG. 20. The content selection unit 13 in the client 1 identifies that the MPD to be played is "http://example.com/content1.mpd" from this URL, and obtains this MPD. Further, the destination for obtaining the MPD and the method for obtaining this is not particularly limited, and so a request may be sent to the server 2 to obtain this, for example.

Also, the content selection unit 13 identifies that the subset with the id=s2 is specified as that to be selected from that which is written after the pound sign in the selection URL (#id=s2). The specification of this subset is that which specifies the analysis range of the MPD, and as a result, the analysis range of the MPD is specified. That is to say, the content selection unit 13 according to the present embodiment functions as means configured to acquire information identifying the analysis range. Also, the content selection unit 13 performs the analysis of the MPD after performing the aforementioned identification.

Regarding the analysis of the MPD for the first period, the content selection unit 13 does not perform the analysis processing on subsets besides the subset S_12 to which is written the id=s2 specified by the URL, and only performs the analysis processing on the subset S_12.

Here, the subset S_12 is configured with representation groups which have the group attribute of g1 and g3. For this reason, the content selection unit 13 analyzes the representation groups G11 and G13 to which group="g1" and group="g3" are written, and identifies the representations belonging to these representation groups as that to be played. Of course, the analysis processing of other representation groups included in the first period is not performed.

Afterwards, the content selection unit 13 obtains and plays the content on the basis of the identified representations. Further, after identifying the representations, the processing until the playback of the content is the same as described regarding the aforementioned embodiments, and so their descriptions are omitted here.

After playback of the first period finishes, the content selection unit 13 similarly analyzes the subset S_22 to which the id="s2" is written regarding the second period. Also, the representation groups G21 and G23 configuring the subset S_22 are analyzed, and the representations belonging to these representation groups are identified as that to be played. The same processing is repeated for the following periods.

In this way, by specifying the subsets to be played using URL descriptions, the analysis processing of the MPD may be simplified even for the first period. Also, as in the example in FIG. 20, by writing the selection candidate URLs in an HTML document, selections may be provided to the user before playback is started.

[Specifications by Other Attribute Information]

According to the examples in FIGS. 20 and 21, the subset id has been used in the specification of that to be played in the URL descriptions, but other attribute information in the MPD may be used to specify that to be played. That is to say, other attribute information in the MPD may be used as the information for specifying the analysis range. Here, examples in which attribute information other than the subset id is used to specify that to be played will be described with FIG. 22 and FIG. 23 as a basis.

Figure 22:
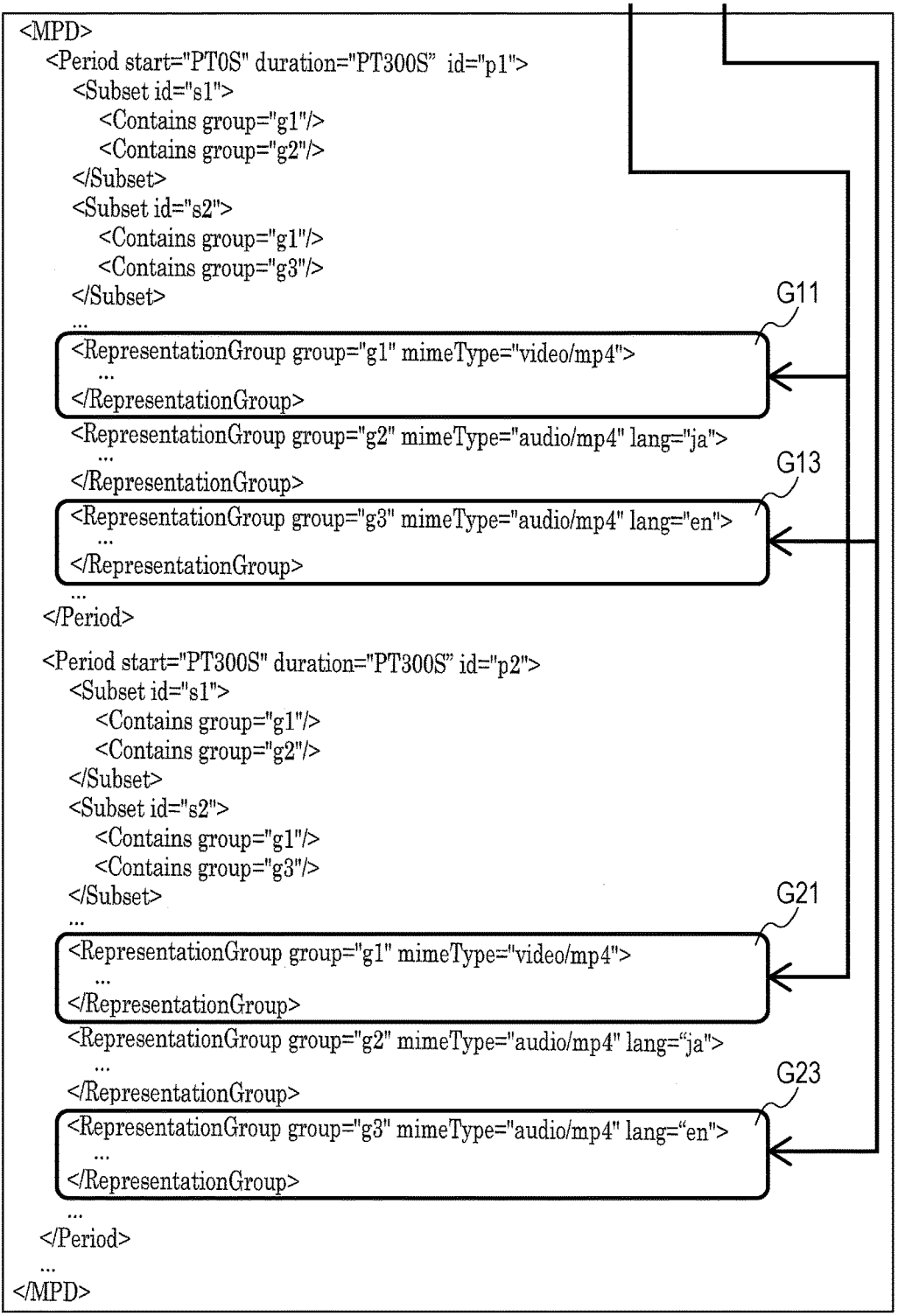
FIG. 22 is a diagram illustrating a relationship between a URL using an attribute value of the group in the specification for that to be played and an MPD parsing range specified from this URL.

FIG. 22 is a diagram illustrating a relationship between a URL using a group attribute value in the specification of that to be played and the analysis range of the MPD identified from this URL. According to the URL description in the same figure, the specification of that to be played is performed with a format of "id="applicable attribute name replacing the id attribute":"attribute value of that to be played"". That is to say, the id=group:g1 is the specification for selecting g1 as the group attribute value of the representation group, and similarly, the id=group:g3 is the specification for selecting g3 as the group attribute value.

The content selection unit 13, which analyzes the MPD illustrated in the same figure in accordance with this URL description, does not perform analysis of the subsets in the first period, and analyzes the representation group G11 to which group="g1" is written and the representation group G13 to which group="g3" is written, on the basis of the specification of the group attribute. Also, the representations belonging to these representation groups are identified as that to be played.

Here, according to the example MPD in FIG. 21, the group attribute values of the representation group configuring the subset with the id=s2 are g1 and g3, which are shared in each period. That is to say, that specified by the URL description in FIG. 21 and FIG. 22 are the same. In this way, a shared group value is added to groups to be played continuously between periods predetermined by the content creator, and that to be played may be identified in the same way as with the subset id by referencing these group attributes externally.

After the playback of the first period finishes, in the same way as with the second period, analysis of the subsets is not performed, the representation groups G21 and G23 are analyzed, and playback of the representations belonging to these representation groups is performed. The same processing is repeated for the following periods.

Also, in the same way as that in FIG. 21 and FIG. 22, that to be played may be specified by using an attribute value shared in each period in the specification of that to be played in the URL description. This will be described with FIG. 23 as a basis.

Figure 23:
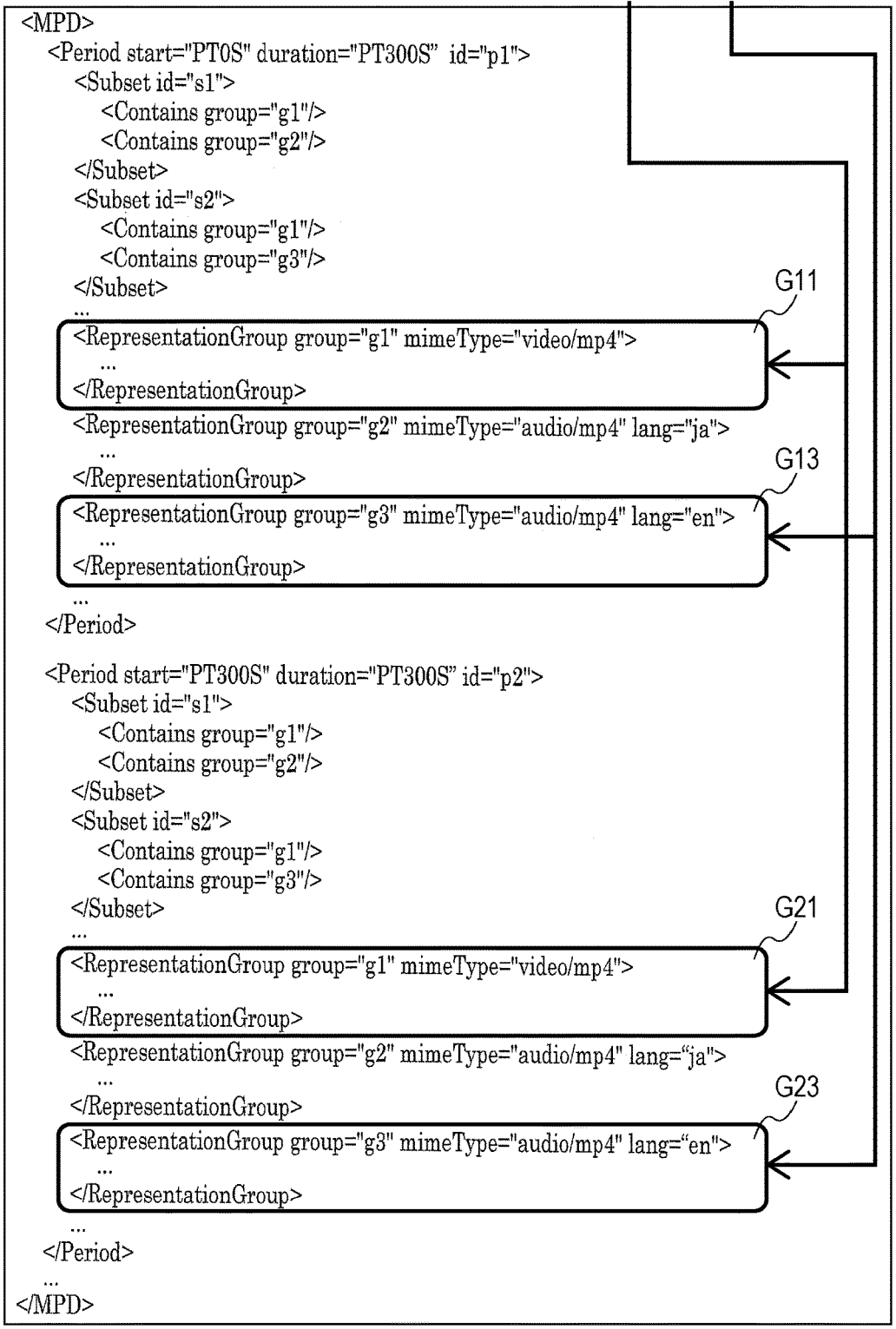
FIG. 23 is a diagram illustrating a relationship between a URL specifying that to be played using a language attribute for a representation group and an MPD parsing range specified from this URL.

FIG. 23 is a diagram illustrating a relationship between a URL specifying that to be played using a language attribute (lang attribute) for representation groups and the analysis range for the MPD specified from this URL. Similar to the example in FIG. 22, the description of the URL in the same figure performs the specification of that to be played in a format of "id="applicable attribute name replacing the id attribute":"attribute value of that to be played"". That is to say, the URL description in FIG. 23 includes a specification for selecting g1 as the group attribute value of the representation group, and a specification for selecting en (English) as the lang attribute value of the representation group.

The content selection unit 13, which analyzes the MPD illustrated in the same figure in accordance with this URL description does not perform analysis of the subsets in the first period, and analyzes the representation group G11 to which group="g1" is written and the representation group G13 to which lang="en" is written, on the basis of the specification of the group attribute. Also, the representations belonging to these representation groups are identified as that to be played. A similar selection is performed for the following periods. That is to say, a playback similar to that as in FIG. 21 and FIG. 22 is performed.

Further, though examples in which that to be played is specified using a shared attribute value for the representation groups have been illustrated as previously described, that to be played may also be similarly specified using a shared attribute value for the representations.

[Specifying the Period for that to be Played]

As previously described, examples in which only the subsets to be played (or representation groups or representations) are specified have been described, but in addition to the specification of that to be played, the playback position of the content (period of that to be played) may also be specified. That is to say, the information for identifying that to be analyzed, which is obtained by the client 1 by a format such as a URL or other, may also include information for specifying the period of that to be played, which specifies the playback period (period) of that to be analyzed in the MPD. As a result, a digest playback may be enabled in which only a portion of the content playback period is played.

For example, the playback period (playback time) may be specified in the URL description with a format of "t="playback start time", "playback end time"". In this case, the content selection unit 13 identifies the representation in which the playback start time to the playback end time is specified by this URL description, and obtains the content for this time. Further, content may be obtained in the same way in cases when the playback time is not specified, and so by notifying the content playback unit 15 of the aforementioned playback start time and playback end time, playback of content for this time may be enabled.

Also, the period for that to be played may be specified using the id attribute in the MPD in the same way as specifying the subset of that to be played (or the representation group or the representation). This will be described with FIG. 24 as a basis.

Figure 24:
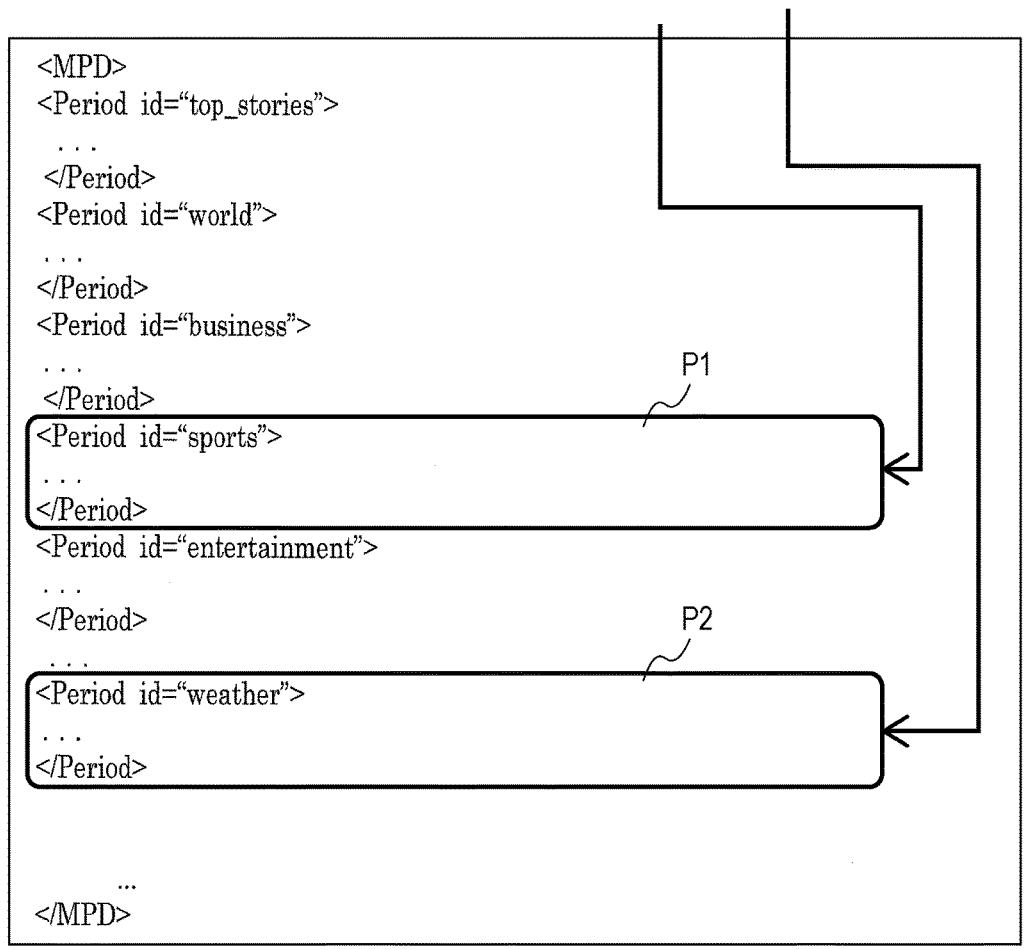
FIG. 24 is a diagram illustrating a relationship between a URL specifying a period for that to be played by the id of a period and an MPD parsing range specified from this URL.

FIG. 24 is a diagram illustrating a relationship between a URL specifying the period of that to be played by a period id and the analysis range of the MPD identified from this URL. According to the URL description in the same figure, sports news (id=sprots) and a weather forecast (id=weather) are specified as that to be played within the MPD representing a configuration of a news program (http://example.com/news.mpd). That is to say, the time for the sports news and the time for the weather forecast is specified as the period for that to be played.

The content selection unit 13, which analyzes the MPD illustrated in the same figure in accordance with this URL description, designates only the periods that have the specified id attribute (P1 and P2 in the same figure) as that to be analyzed. That is to say, analysis of the subsets, representation groups, and representations in this period is performed, and the representations are identified. As a result, only the sports news and weather forecast from the news program content is played as a digest.

Further, when specifying the period for that to be played by URLs, this may be specified with the format of "id="id attribute value representing the playback start position", "id attribute value representing the playback end position"" instead of the aforementioned "id="id attribute value of that to be played"" in order to simplify the specification of multiple periods for that to be played.

For example, when the description specifying the period for that to be played in the URL description in FIG. 24 (description after the pound sign) is "id=sport,weather", this description represents that a sequence of content from the sports news to the weather forecast is to be played. Therefore, the content selection unit 13, which analyzes the MPD in accordance with this URL description, analyzes from P1 to P2 in accordance with the specification "id=sport, weather". As a result, the sequence of content corresponding to this analysis range (content included in three periods represented by id=sport, id=entertainment, and id=weather) is played.

Also, between the "id attribute value representing the playback start position" and the "id attribute value representing the playback end position", one of these may be omitted. For example, using the description "id=,weather" in which the specification of "id attribute value representing the playback start position" is omitted, playback from the first period until the weather forecast (P2) is specified. Also, when using the description "id=sports," in which the specification of "id attribute value representing the playback end position" is omitted, playback from the sports news (P1) and all following periods becomes the period for that to be played.

Here, when specifying the period for that to be played using the period id, the position during a period cannot be used to specify the playback start or end time, and so the performance of fine time specifications cannot be performed. However, as in the example in FIG. 24, by provisioning rules for adding the id depending on the part of the predetermined video content, and determining the URLs for digest playback depending on these parts beforehand, general specification of the periods for that to be played using the period id are enabled.

That is to say, as in the example of the aforementioned news program, a rule for adding the "id=sports" to the sports news is provisioned, and the "id=sports" is written in the URL. As a result, the client 1, which follows this rule, may perform the digest playback of only the sports news. Also, by previously preparing a digest playback selection menu of the different parts formatted as an HTML document or other, the user may select the desired parts.

[Playback when Both that to be Played and the Period of that to be Played are Specified]

Next, the playback processing at the client 1 when both the specification of the subsets to be played (or representation groups or representations) and the specification of the periods for that to be played are specified at the same time will be described with FIG. 25 and FIG. 26 as a basis.

Figure 25:
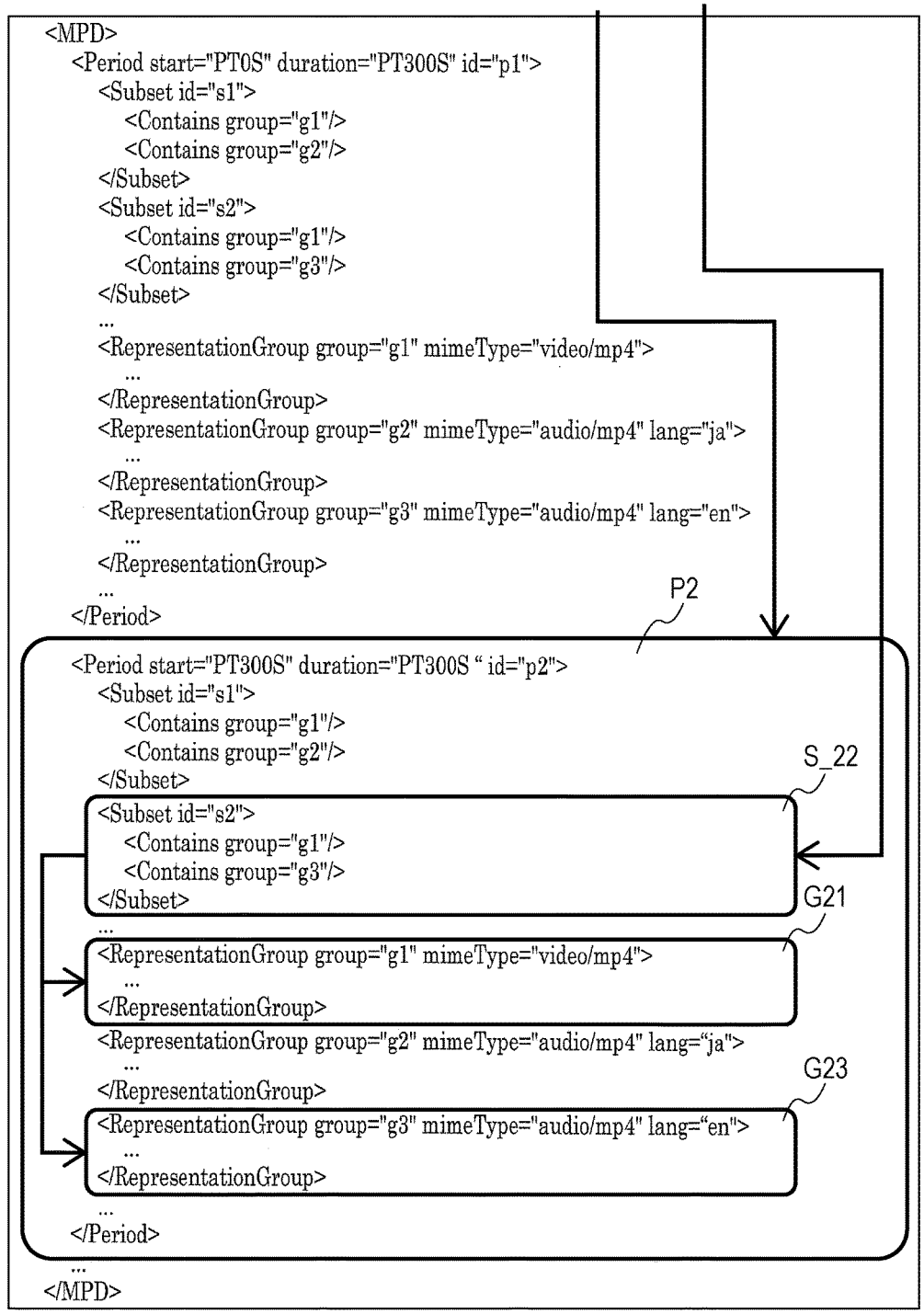
FIG. 25 is a diagram illustrating a relationship between a URL specifying a period for that to be played and the subset to be played and an MPD parsing range specified from this URL.

FIG. 25 is a diagram illustrating a relationship between a URL specifying the subsets to be played and the periods for that to be played and the analysis range of the MPD identified from this URL. Also, FIG. 26 is a diagram illustrating that to be analyzed as identified from the URL description in FIG. 25.

The URL in the example in FIG. 25 describes the MPD to be played as "http://example.com/content1.mpd". Also, this URL describes the period for that to be played as "id=p2,". As previously described, this specifies the period with the id=p2 and the periods following as the period for that to be played. Also, that to be played is described as "id=s2". As previously described, this specifies the subset with the id=s2.

Figure 26:
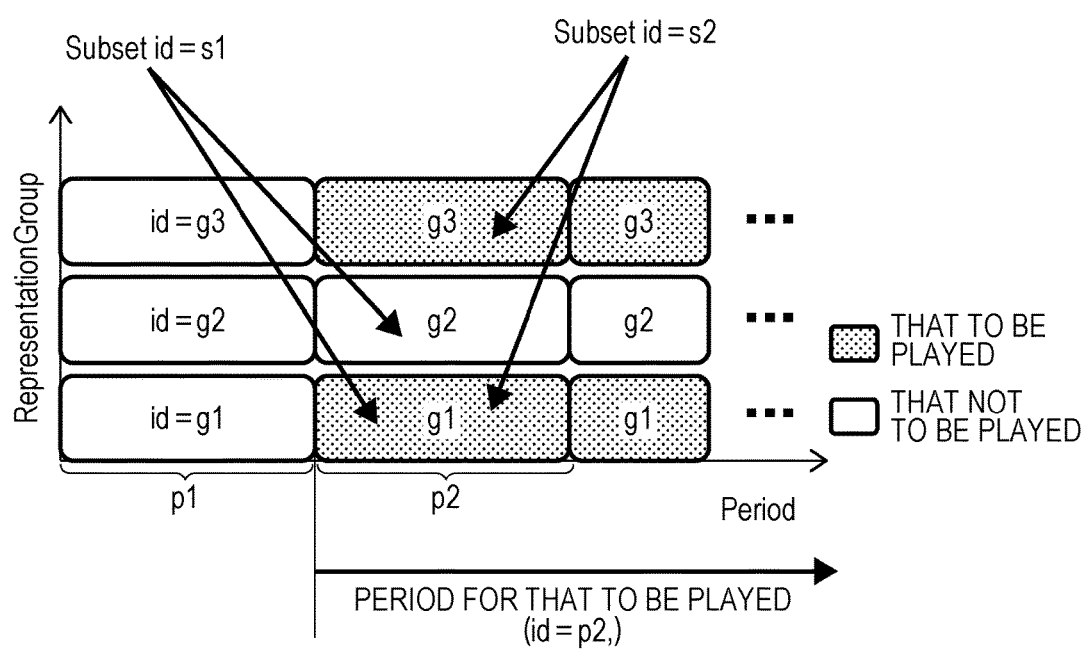
FIG. 26 is a diagram illustrating that to be parsed as specified from the URL description in FIG. 25.

In this way, when specifying both the period for that to be played and that to be played, the client 1 performs playback of that to be played included in the specified period for that to be played, as illustrated in FIG. 26. That is to say, the content selection unit 13 designates the subsets with the id=s2 as that to be analyzed from the period with the id of p2 and the periods following. According to the example, the subset with the id of s2 includes the representation groups with the group attribute of g1 and g3, and so g1 and g3 become that to be analyzed, and the content corresponding to the representations included in these become that to be played.

That is to say, according to the example in FIG. 25, as the period with the id of p2 and the periods following are designated as the period for that to be played, the content selection unit 13 does not perform analysis within the first period, which does not have the id of p2, and designates the second period (P2) to which the id="p2" is written and the following periods as that to be analyzed.

Also, in period P2 only the subset S_22 to which the id="s2" is written is designated as that to be analyzed, and so analysis processing is not performed on any other subsets. Specifically, the subset S_22 is configured by the representation groups with the group attribute of g1 and g3. For this reason, the content selection unit 13 analyzes the representation groups G21 and G23 to which the group="g1" and group="g3" are written, and identifies the representations belonging to these representation groups. Of course, the analysis processing is not performed on the other representation groups included in the period P2. A similar processing is repeated for the following periods, which are the periods for that to be played.

As previously described, by using URLs specifying the subsets to be played (or representation groups or representations) and the periods for that to be played, a digest playback of content may be performed. Also, by writing these URLs to an external HTML document or other, this may be used as a content selection menu. Also, similar to the aforementioned embodiments, by restricting the MPD analysis range during playback, the MPD analysis processing may be simplified.

[Example of Using that Other than URL Specifications]

As previously described, URLs specifying the subsets to be played (or representation groups or representations) and the periods for that to be played may be used as a content selection menu for the user.

Also, these URLs may be used as information for identifying the playback start position in such cases as when playback is interrupted on the client 1 and restarts, or when playing on a different playback device and handing over the playback state. That is to say, the client 1 generates the content that has been playing and the URL identifying the interruption position of playback, and may restart playback at the playback state at the time of the interruption by referencing this when restarting playback. Also, by notifying these URLs to other playback devices, the playback state may be handed over to these other playback devices.

For example, it can be though to generate these kinds of URLs and notify them to a playback device when the client 1 is a device with a comparatively small screen such as a smartphone, and the content currently playing on this device is desired, by user operation, to be handed over and played on a playback device with a relatively large screen such as a television.

Figure 27:
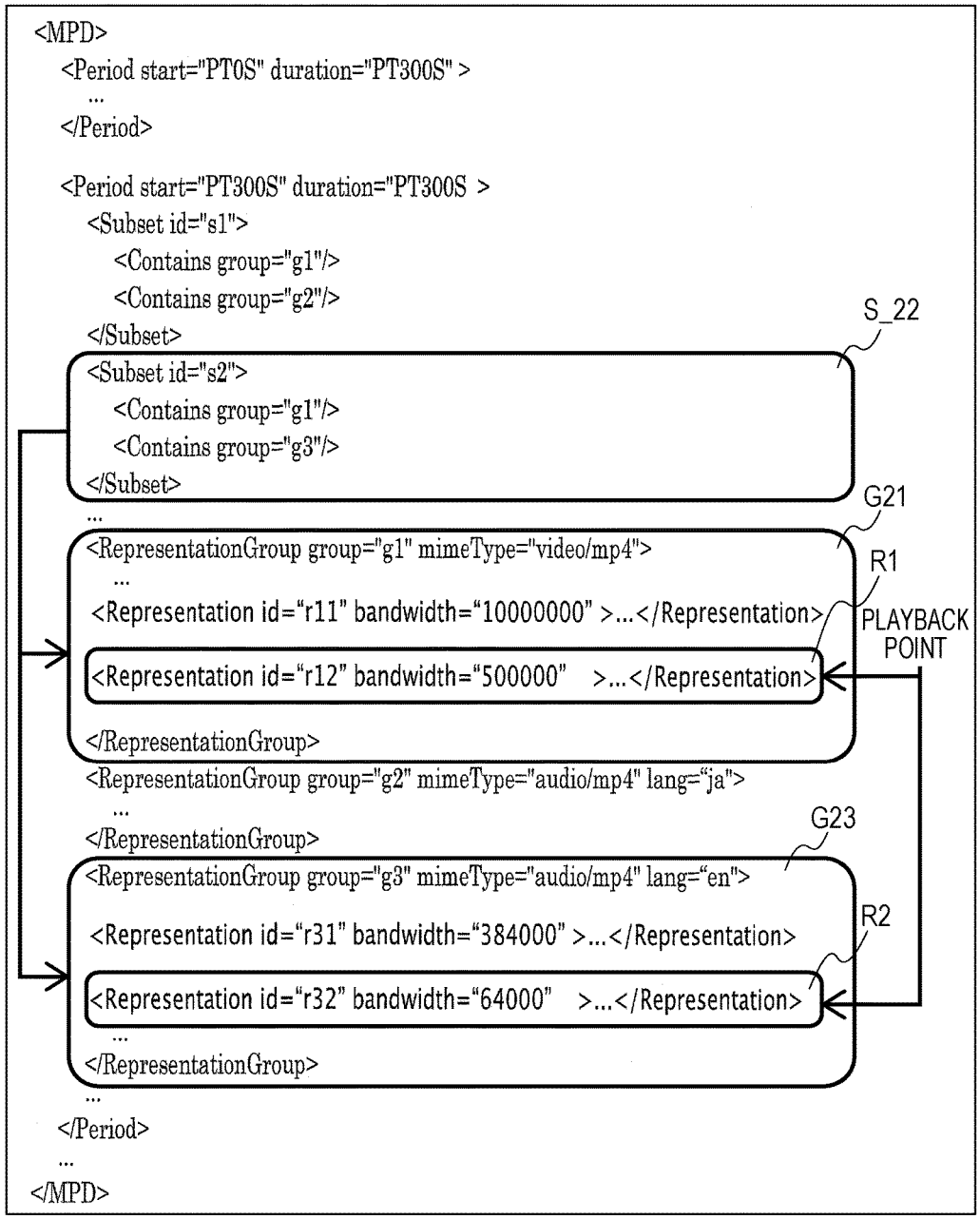
FIG. 27 is a diagram illustrating an example of a playback point of the MPD to be played, and a URL generated when playback is interrupted at this playback point.

The generation of URLs for handing over the playback state will be described with FIG. 27 as a basis. FIG. 27 is a diagram illustrating an example of a playback position in the MPD to be played, and a URL generated when playback is interrupted at this playback position.

According to the illustrated example, the MPD to be played is "http://example.com/content1.mpd", and represents that the media segments corresponding to the representations R1 and R2 are currently playing by the content playback unit 15 in the client 1. Further, the representations R1 and R2 are included in the period beginning from PT300S, and after 100 seconds has passed since the playback of the content corresponding to the representations R1 and R2 has started, the playback time becomes PT400S.

Regarding this kind of playback state, when user operation is performed to play the currently playing content on another device (when a request to notify the playback state is generated), the content playback unit 15 in the client 1 generates a URL corresponding to the playback position at this time. That is to say, according to the present embodiment, the content playback unit 15 functions as means configured to generate information to identify the analysis range, which identifies the analysis range of the MPD. Of course, means configured to generate information to identify the analysis range may be provisioned as something other than the content playback unit 15.

According to the example in FIG. 27, the currently playing representation R1 is a representation belonging to the representation group G21, and the representation R2 is a representation belonging to the representation group G23. Also, the representation groups G21 and G23 are the representation groups configuring the subset S_22. Therefore, the content playback unit 15 determines that the subset to be played is specified with the "id=s2".

Also, it is determined that the range of that to be played after the playback restarts is specified as "t=400," from the fact that the playback time is PT400S. Also, the MPD to be played is http://example.com/content1.mpd.

Therefore, the content playback unit 15 generates "http://example.com/content1,mpd#id=s2&t=400," as the URL to be notified to the playback device to which the playback of content is handed over. Also, the content playback unit 15 notifies this URL to the playback device in accordance with the user request.

At the playback device receiving this notification, analysis of the periods in which the playback start time is after PT400S starts on the basis of the notified URL. Specifically, the analysis processing is performed on the subset S_22 to be played to which the id="s2" is written as specified by the aforementioned URL from the subsets included in the periods after PT400S. That is to say, the content playback unit 15 functions as means configured to transmit identification information. Of course, means configured to transmit identification information other than the content playback unit 15 may be provisioned.

Next, the aforementioned playback device analyzes the representation groups G21 and G23 configuring the subset S_22. Also, the representations belonging to these representation groups are selected, and playback after PT400S is started. As a result, the playback state at the client 1 is handed over to the playback device.

Further, playback of other representations belonging to the representation groups G21 and G23 not limited to the representations R1 and R2 that have been playing on the client 1 may be allowed on the playback device to which the playback state of the client 1 has been handed over depending on the playback performance of the device, the communication environment, and so on.

Also, though the subset id specifying that to be played has been used according to the aforementioned example, the specification of that to be played using the group attribute for the representation groups and the representation ids is also possible.

Fifth Embodiment

The MPD according to the aforementioned embodiments is one complete MPD that does not reference external data, but various types of playback become possible by referencing external data. According to the present embodiment, an example in which playback is performed using an MPD that references other MPDs will be described with FIG. 28 through FIG. 30 as a basis. Further, the configuration of the system and devices is the same as that for the first Embodiment (refer to FIG. 1).

Here, when describing that to be played using an HTML document, as described with FIG. 20 as a basis, the user may be allowed to make selections by displaying images such as URL text and icons. However, according to this configuration, the user has to decide whether or not to select some content from only the limited information obtainable from the text and icons, and so it may be thought that sometimes undesirable content is selected. This is because the content corresponding to the provided text cannot be viewed until after this text and so on is selected.

Thus, the client 1 according to the present embodiment provides content to be selected as video by using MPDs (content information on that to be selected) to which externally referenced URLs (information for specifying a change destination) pointing to other MPDs (information for selecting a change destination) in each period are written. In this way, the aforementioned problem may be resolved by the content to be selected as video content instead of text, icons, and so on.

First, the MPD referenced by the client 1 will be described with FIG. 28 as a basis. FIG. 28 is a diagram illustrating an example of an MPD which references other MPDs. In FIG. 28, the URL of the MPD to be externally referenced is written into each period with a format of "xlink:href="URL of the destination to be externally referenced"". For example, for the period to which id="period11" is written, the "http://example.com/Dorama_Ep1mpd#id=period1," is the URL for the MPD set to the externally referenced destination. More specifically, the "http://example.com/Dorama_Ep1mpd" from this URL specifies the MPD, and the "#id=period1," specifies the playback position in this MPD. That is to say, the "#id=period1," may be said to be the information specifying the playback position.

Further, the "xlink" is normally used to embed the external data into the MPD at the description position of the "xlink", and this is interpreted at the default state to perform an embedding of data. However, according to the present embodiment, the "xlink" references other MPDs, and is used for a purpose different from normal usage, in which a change in that to be played is performed. For this reason, according to the illustrated MPD, "xlink:show="new"" is written as information representing that this will be used for a new purpose instead of the default purpose.

When performing a playback using this kind of MPD, the client 1 performs an operation to change that to be played to the content identified by the URL for the externally reference destination in the period when a predetermined user operation is performed during playback of this period. As a result, it is possible to use the video content (MPD) as a selection menu.

Figure 29:
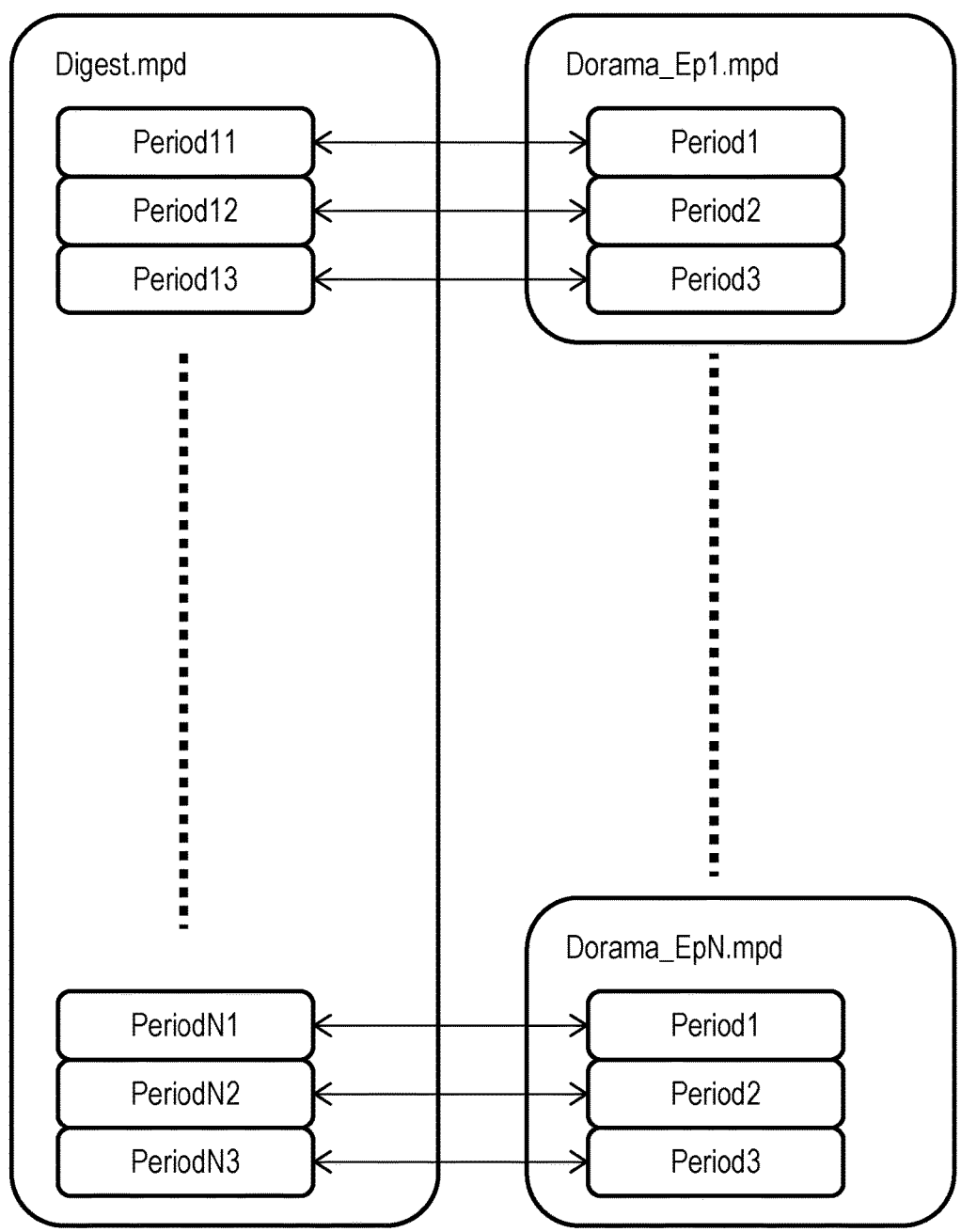
FIG. 29 is a diagram illustrating a reference relationship between a period for a drama main story and a period for a digest video when using a digest video of a drama main story as a selection menu.

Here, an example using the video content (MPD) as a selection menu will be described with FIG. 29 as a basis. FIG. 29 is a diagram illustrating a reference relationship between a period of a drama main feature and a period of a digest video in a case when the digest video of the drama main feature is used as a selection menu. According to this kind of content, the content selected at each period may be expressed as a portional content configuring a portion of the content such as the drama main feature or the digest video.

The same figure illustrates an MPD (Drama_Ep1.mpd through Drama_EpN.mpd) representing the drama main feature (the first episode through the nth episode) and an MPD (Digest.mpd) representing a digest video corresponding to each drama main feature (the first episode through the nth episode of the dram main feature). The user may perform playback changing from this digest video to the drama main feature. That is to say, the digest video is used as a selection menu of the drama main feature.

According to this example, externally referenced URLs instructing the playback of a corresponding scene of the main drama feature (corresponding period) and the following scenes are written into each period configuring the digest video (Period11 through PeriodN3). For example, an externally referenced URL instructing the playback of Period1 of the drama main feature and the following periods as that to be played is written into Period11 of the MPD for the digest video (refer to FIG. 28).

Also according to this example, externally referenced URLs instructing the playback of the period corresponding to the digest video and the following periods are written into the each period of the dram main feature. Further, regarding the MPD of the dram main feature, externally referenced URLs specifying the MPD of the corresponding digest video are written into each period in the same format as for the MPD of the digest video illustrated in FIG. 28. For example, an externally reference URL specifying Period11 of the digest video and the following periods as that to be played is written in Period1 of the first episode of the drama main feature.

According to the example in FIG. 29, externally referenced URLs specifying the corresponding periods are written into the MPDs of both the drama main feature and the digest video in this way. As a result, the MPD of the drama main feature and the MPD of the digest video are mutually referenced as illustrated by the arrows in the same figure.

At the client 1 performing playback using these kinds of MPDs, when a predetermined user operation (a button pressing or similar) is performed instructing the change to the main feature during the playback of the digest video as the selection menu, playback is changed to the corresponding scene (corresponding period) of the drama main feature. Also, the following scenes continue to be played after this corresponding scene finished playback.

Specifically, when the content selection unit 13 in the client 1 detects that the aforementioned user operation has been performed, the periods played by the content playback unit 15 at this time are identified. Next, the content selection unit 13 obtains the MPD specified by the externally referenced URL included in the identified period. Also, the content selection unit 13 identifies the periods to be played that are specified by the aforementioned externally referenced URL for this MPD. As a result, the content of the identified periods are played. Also, the following periods continue to be played after this period finished playback.

Similarly, when user operation is performed to change to the digest video during playback of the drama main feature, playback is changed to the corresponding scene (corresponding period) of the digest video. Also, the following scenes continue to be played after this corresponding scene finishes playback.

As previously described, video content may be used as the selection menu by specifying the change destination of the period with externally referenced URLs.

[Example of Using Specifications Other than URLs]

According to the examples in FIG. 28 and FIG. 29, the specification of the change destinations with externally referenced URLs is performed in units of periods, and mutual referencing is performed in units of periods, a configuration may perform mutual referencing in finer units such as units of media segments. However, as the need arises to write many externally referenced URLs in order to perform mutual referencing at units finer than units of periods, it is desirable to simplify these descriptions using a method such as with the example illustrated in FIG. 30.

FIG. 30 is a diagram illustrating an example of an MPD performing the specification of MPD change destinations in units of media segments. According to the MPD (http://example.com/content1_ff.mpd) in (a) of FIG. 30, "http://example.com/content1_ff.mpd#t=idx:$idx," is written as the externally referenced URL for the period. Also, the identification information for identifying media segments is written into each media segment with a format of "idx="identification number"". Further, the MPD (http://example.com/content1_ff.mpd) specified by this externally referenced URL is illustrated in (b) of the same figure.

Here, the "t=idx:" in the aforementioned externally referenced URL is the specification using a segment index to specify the periods for that to be played, and the "$idx" is the specification designating the segment index value of the media segment currently playing as a parameter. Further, according to the example in FIG. 30, there is a "," after the "$idx", and as previously described, this is the description format when specifying only the playback start position. That is to say, according to this example, the media segments following the segment index value designated as the parameter also become that to be specified.

The externally referenced URL is specified depending on the media segment currently playing by this specification of "t=idx:$idx,". For example, when the media segment represented by the <Url source URL="content1_seg5.3gs" idx=5/> in (a) of the same figure is currently playing, the "5", which is the segment index value of this media segment becomes the parameter. That is to say, the externally referenced URL is "http://example.com/content1_ff.mpd#t=idx:5,".

Therefore, when a predetermined user operation for performing the change is performed during the playback of the <Url source URL="content1_seg5.3gs" idx=5/> media segment, as illustrated the arrows in the same figure, playback switches to the corresponding media segment <Url source URL="ff_seg5.3gs" idx=5/> in (b) of the same figure. Also, continued playback of media segments following after this is performed after this media segment finishes playback.

Specifically, when the content selection unit 13 in the client 1 detects that the aforementioned user operation has been performed, the MPD specified by the "xlink:href=" in the MPD currently under analysis is obtained. Also, the segment index value of the media segment played by the content playback unit 15 at this time is identified. Also, the media segment of the aforementioned and identified segment index value is identified in the aforementioned and obtained MPD are identified as that to be played. As a result, the identified media segment is played. Also, the following media segments continue to be played after this media segment finished playback.

Similarly, when a similar user operation is performed during playback of the media segment <Url source URL="ff_seg5.3gs" idx=5/> in (b) of the same figure, as illustrated by the arrows in the same figure, playback changes to the corresponding media segment <Url source URL="content1_seg5.3gs" idx=5/> in (a) of the same figure. Also, continued playback of media segments following after this is performed after this media segment finishes playback.

In this way, descriptions may be simplified as compared to a case when specifying media segments individually by designating the externally referenced URL to specify the media segment with the same segment index value as the media segment currently playing.

Also as illustrated in the example in FIG. 30, a trick play may be performed by freely changing the playback speed of the content by using an MPD performing mutual referencing in units of media segments.

For example, let us assume that (a) in FIG. 30 is video content at normal playback speed, and (b) of the same figure is video content corresponding to a playback speed of 10 times that of the video content in (a). In this case, a playback in which the normal playback video and the playback video at 10-time speed is mutually changed is enabled by mutual referencing between these corresponding media segments. That is to say, an operation equivalent to a difficult trick play (changing of arbitrary timings between high-speed playback and normal playback) regarding normal streaming playback is achieved. Of course, in this case, the idx included in each MPD has to be set regarding the media segments corresponding to (matching) idx so that the same content is played at different playback speeds.

[Obtaining the Content]

According to the aforementioned embodiments, examples have been described in which content has been obtained by requesting the server 2, but a configuration in which content is obtained without requests is within the scope of the present invention. For example, content delivered as a multicast, or content transmitted by broadcasting may be received and played in accordance with the selection of the content selection unit 13.

With such a configuration, content to be played at a certain playback period may be selected by referencing the MPD according to the aforementioned embodiments, and at the same time, the content to be played at the playback period to be played next may be readily selected.

[About the Data Structure of Combined Information and the Recording Medium for Recording the Combined Information]

The data structure of the information representing the continuity of content when transitioning between periods, the information representing groups included in all subsets, and description information including at least some kind of information for referencing other description information as previously described (e.g., MPD), the recording medium recording the description information, and the method for generating the description information are included in the scope of the present invention.

As this recording medium, for example, tape such as magnetic tape and cassette tape, disks including magnetic disk such as floppy disk (registered trademark) and hard disk, and optical disk such as CD-ROM, MO, MD, DVD, BD, and CD-R, cards such as IC cards (including memory cards) and optical cards, semiconductor memory such as mask ROM, EPROM, EEPROM, and flash ROM, and logical circuits such as PLD (Programmable logic device) and FPGA (Field Programmable Gate Array) may be used.

[About Combinations of the Embodiments]

The present invention is not limited to the aforementioned embodiments, various modification under the scope represented by the claims are possible, and the technical scope of the present invention includes embodiments obtained by desirable combinations of technical methods disclosed in the different embodiments. Also, the scope of the present invention also includes optional configurations as combinations of configurations of the different embodiments such as writing information for referencing other MPDs to the MPD including an id specifying the subset to be selected at the next period.

[Example Configuration by Software]

Lastly, each block of the client 1 and the server 2 may be achieved by hardware of logical circuits in which the client control unit 10 and the server control unit 20 in particular are formed on integrated circuits (IC chips), or may be achieved as software using a CPU (Central Processing Unit).

In the case of the latter, the client 1 and the server 2 are provisioned with a CPU for executing instructions of a program for achieving each function, ROM (Read Only Memory) for storing the aforementioned program, RAM (Random Access Memory) for deploying the aforementioned program, a storage device (storage medium) such as memory for storing the aforementioned program and various data, and so on. Also, the object of the present invention is also attainable by providing, to the client 1 and server 2, a recording medium to which program code (executable format program, intermediate code program, and source program) of a control program of the client 1 and server 2 in which the aforementioned functions are achieved as software is recorded in a computer-readable format, and reading and executing the program code recorded in the recording medium by this computer (or CPU, or MPU).

As the aforementioned recording medium, for example, tape such as magnetic tape and cassette tape, disks including magnetic disk such as floppy disk (registered trademark) and hard disk, and optical disk such as CD-ROM, MO, MD, DVD, BD, and CD-R, cards such as IC cards (including memory cards) and optical cards, semiconductor memory such as mask ROM, EPROM, EEPROM, and flash ROM, and logical circuits such as PLD (Programmable logic device) and FPGA (Field Programmable Gate Array) may be used.

Also, the client 1 and server 2 may be configured to be connectable to a communications, and the aforementioned program code may be provided via a communications network. This communications network is not particularly limited as long as the program code is transmittable. For example, the Internet, intranets, extranets, LAN, ISDN, VAN, CATV communication networks, virtual private networks, phone line networks, mobile communication networks, satellite communication networks, and so on may be used. The transmission medium configuring these communication networks is not limited to particular configurations or types as long as the medium is able to transmit the program code. For example, wired connections such as IEEE1394, USB, power line delivery, cable TV lines, phone lines, ADSL (Asymmetric Digital Subscriber Line), infrared such as IrDA and remote controls, and wireless connections such as Bluetooth (registered trademark), IEEE802.11 wireless, HDR (High Data Rate), NFC (Near Field Communication), DLNA (Digital Living Network Alliance), cellular phone networks, satellite lines, terrestrial digital networks, and so on may be used. Further, the present invention may be implemented as a form of computer data signal embedded in a carrier which embodies the aforementioned program code as an electronic transmission.

[Conclusion]

The playback device disclosed in the aforementioned embodiments obtains and plays content selected after referencing content information on that to be selected including information representing acquirable content in each playback period of the content, in which identification information for identifying content to be played at the playback period to be played next corresponding to the content selected at a certain playback period is included in the aforementioned content information on that to be selected, and this playback device includes selection means configured to select content to be played at the aforementioned certain playback period after referencing the aforementioned content information on that to be selected, and at the same time, for selecting content to be played at the playback period to be played next in accordance with the aforementioned identification information, acquisition means configured to acquire the content selected by the aforementioned selection means, and playback means configured to play content acquired by the aforementioned acquisition means at a certain playback period as previously described and for continuously playing the content to be played at the playback period to be played next.

The control method for the playback device disclosed in the aforementioned embodiments controls the playback device to obtain and play content selected after referencing content information on that to be selected including information representing acquirable content in each playback period of the content, in which identification information for identifying content to be played at the playback period to be played next corresponding to the content selected at a certain playback period is included in the aforementioned content information on that to be selected, and this control method includes a selection step for selecting content to be played at a certain playback period after referencing the aforementioned content information on that to be selected, and at the same time, for selecting content to be played at the playback period to be played next in accordance with the aforementioned identification information, an acquisition step for acquiring the content selected by the aforementioned selection step, and a playback step for playing content acquired by the aforementioned acquisition step at a certain playback period as previously described and for continuously playing the content to be played at the playback period to be played next.

According to the aforementioned configuration, identification information for identifying content to be selected at the playback period to be played next corresponding to the content selected at a certain playback period is included in the aforementioned content information on that to be selected. Also, content to be played at the playback period to be played next is selected in accordance with this identification information, the selected content is acquired and played during each playback period.

Therefore, when transitioning from a certain playback period to the playback period to be played next, content depending on the content selected at a certain playback period is readily selected, and this may be acquired and played.

Further, the aforementioned identification information may directly specify the content, or may be that for filtering candidates of content to be selected. Also, when content is selected from filtered content after selecting the information filtering the content to be selected at a certain playback period, the aforementioned identification information may represent information filtering content to be selected at the playback period to be played next depending on the information filtering the content to be selected that was selected at a certain playback period.

Also, a certain playback period and the playback period to be played next may be playback periods continuing on a timeline such as the playback period immediately before or immediately after, or may be playback periods separated on a timeline.

Further, a certain playback period and the playback period to be played next may be playback periods included in individual content information on that to be selected. That is to say, when selecting content from a playback period in the content information on that to be selected after selecting content from a playback period in the content information on that to be selected, the content may be selected using the aforementioned identification information.

Also, regarding the aforementioned configuration, the method for acquiring the content is not particularly limited, and for example, content may be received by requesting the server, or content may be received as transmitted from the server without the performance of a request to the server.

Also, it is desirable that the aforementioned content information on that to be selected includes at least one group specification information per playback period, in which at least one group is specified such that content belongs to groups wherein content included in the same group cannot be played simultaneously, but content included in different groups may be played simultaneously, the aforementioned identification information includes information specifying the group specification information to be selected at the playback period to be played next corresponding to the group specification information selected at a certain playback period, and the aforementioned selection means selects the aforementioned group specification information at a certain playback period, and at the same time, selects the content belonging to the group specified by the selected group selection information, and regarding the playback period to be played next, the group selection information specified by the aforementioned identification information to which a correspondence with the group specification information selected at a certain playback period as previously described is added is selected, and the content belonging to the group specified by the selected group specification information is selected.

According to the aforementioned configuration, the content information on that to be selected includes at least one group specification information per playback period specifying at least one group. Also, the playback device selects the group specification information in accordance with the information specifying the group specification information to be selected at the playback period to be played next corresponding to the group specification information selected at a certain playback period included in the identification information.

By selecting the group specification information, the content to be selected is limited to that belonging to the group specified by the group specification information. That is to say, the group specification information may be said to be information filtering the content to be selected. For this reason, according to the aforementioned configuration, the content to be selected may be readily filtered, and as a result, the processing load from selecting content is reduced.

Further, as the content included in the same group cannot be played simultaneously, one content is selected from one group. Also, it may be required to select one content from one group, or not selecting content may be allowed.

Also, as content included in different groups may be played simultaneously, the overall framework of content is determined by the group specification information. That is to say, content is determined at the application level by the selected group specification information.

For example, when the group specification information specifying a group including video content and a group including Japanese dialogue content is selected, the video and actual dialogue contents changed depending on what content is selected from the group, but the playback of video content with Japanese dialogue is definitive.

Therefore, according to the aforementioned configuration for selecting the group specification information, continuity of content may be maintained at the application level in accordance with the information specifying the group specification information to be selected at the playback period to be played next corresponding to the group specification information selected at a certain playback period.

Also, it is desirable that the aforementioned content information on that to be selected includes group specification information for essential selection representing groups that have to be selected, and the aforementioned selection means selects the content belonging to the group specified by the aforementioned group specification information for essential selection as well at the aforementioned playback period to be played next.

According to the aforementioned configuration, when the group that has to be selected is not included in the group specification information selected in accordance with the identification information, the group that has to be selected may be reliably selected.

Also, it is desirable that the aforementioned identification information further includes information specifying content to be selected at the playback period to be played next corresponding to the content selected at a certain playback period as previously described, and the aforementioned selection means selects the content when the content specified by the aforementioned identification information is included in the group specified by the group specification information selected at the aforementioned playback period to be played next, and selects the content belonging to the group when not included.

According to the aforementioned configuration, the identification information further includes information specifying content to be selected at the playback period to be played next, and so the content depending on the content selected at a certain playback period may be readily selected.

However, when continuity is given priority at the content level, there is a potential that the continuity at the application level breaks. For example, it may be thought that the continuity for the bit rate, resolution, and so on are maintained, but the usage language or other is changed.

For this reason, according to the aforementioned configuration, the content is selected when the content specified by the identification information is included in the group specified by the selected group identification information, and the content belonging to the group specified by the selected group specification information is selected with not included.

As a result, the load caused by the selection of content may be further reduced within a range such that the continuity at the application level is not broken.

Also, it is desirable that the aforementioned content information on that to be selected includes substitute specification information representing the group specification information to be selected when the group specification information cannot be selected in accordance with the aforementioned identification information, and the aforementioned selection means selects the group specification information representing the aforementioned substitute specification information when the group specification information cannot be selected in accordance with the aforementioned identification information, and selects the content belonging to the group specified by the selected group specification information.

According to the aforementioned configuration, even when the group selection information specified by the identification information cannot be selected, there is still no need to have the user select the group specification information as the group specification information and content is selected in accordance with the substitute specification information. Also, when changing playback periods, continuity of some content may be maintained.

Further, cases in which the group specification information cannot be selected in accordance with the identification information, for example, include such cases as when the group specification information specified by the identification information is not included in the applicable playback period, or when a correspondence with the group specification information selected at the playback period before changing is not added to the identification information.

Also, it is desirable that the aforementioned selection means selects the group specification information specified by the aforementioned identification information at the playback period to be played next when the group specification information specified by the aforementioned identification information to which a correspondence with the group specification information selected at a certain playback period as previously described is added is not included in the playback period to be played next, and selects the content belonging to the group specified by the selected group specification information.

According to the aforementioned configuration, the group specification information and content specified by the identification information is selected at the playback period to be played next after the playback period when the group specification information and content was selected in accordance with the substitute specification information.

Therefore, when performing playback in which playback periods not including the group specification information specified by the identification information are sandwiched, continuity of the content may be maintained.

Also, it is desirable that the aforementioned content information on that to be selected includes content affiliation information per playback period, in which at least one content is specified such that content belongs to groups wherein content included in the same group cannot be played simultaneously, but content included in different groups may be played simultaneously, the aforementioned identification information includes information specifying the content affiliation information to be selected at the playback period to be played next corresponding to the content affiliation information selected at a certain playback period, and the aforementioned selection means selects the aforementioned content affiliation information at a certain playback period, and at the same time, selects the content specified by the selected content affiliation information, and regarding the playback period to be played next, the content affiliation information specified by the aforementioned identification information is selected, and the content represented by the selected content affiliation information is selected.

According to the aforementioned configuration, the content information on that to be selected includes content affiliation information representing at least one content included in a group each playback time. Also, the playback device selects the content affiliation information in accordance with the information specifying the content affiliation information to be selected at the playback period to be played next corresponding to the content affiliation information selected at a certain playback period included in the identification information.

By selecting the content affiliation information, the content to be selected is limited to the content represented by the content affiliation information. That is to say, the content affiliation information may be said to be information filtering the content to be selected. For this reason, according to the aforementioned configuration, the content to be selected may be readily filtered, and as a result, the processing load from selecting content is reduced.

Further, the content affiliation information may be included in each of multiple, corresponding groups for one playback period, and in this case, multiple content affiliation information may be selected at one playback period. When selecting multiple content affiliation information, the content affiliation information corresponding to the previously selected content affiliation information is selected at the playback period to be played next. Also, the selection of content is performed for each selected content affiliation information. Further, as long as at least one content is eventually selected, there may be content from the selected content affiliation information that is not selected.

Also, the aforementioned content information on that to be selected may include content specification information per playback period specifying content, the aforementioned identification information may include information specifying the content specification information selected at the playback period to be played next, and the aforementioned selection means may select the content specified by the aforementioned content specification information at a certain playback period, and may select the content specification information specified by the aforementioned identification information at the playback period to be played next, and may select the content specified by the selected content specification information.

According to the aforementioned configuration, content is selected at a certain playback period by the content specification information included in the content information on that to be selected, and the content specified by the selected content specification information is selected in accordance with the identification information. Therefore, content may be readily selected at a certain playback period and at the playback period to be played next.

Also, it is desirable that the identification information included in the content information on that to be selected in a certain playback period as previously described includes information for identifying content to be selected at the playback period immediately after this certain playback period, and when the playback period to be played next is the playback period immediately after a certain playback period as previously described, the aforementioned selection means references the information included in the identification information for identifying the content to be selected at the playback period immediately after a certain playback period to select the content.

According to the aforementioned configuration, the identification information included in the content information on that to be selected in a certain playback period included information for specifying content to be played at the playback period immediately after this certain playback period. Also, when the playback period to be played next is the playback period immediately after a certain playback period as previously described, the playback device references the information included in the identification information for identifying the content to be selected at the playback period immediately after a certain playback period to select the content.

Therefore, the playback device may readily select content depending on the content selected at a certain playback period for the playback period immediately after a certain playback period.

Further, it is desirable that when the information for identifying the content to be selected at the playback period to be played next is included in the identification information, regardless of the positional relationship regarding the playback time axis between a certain playback period and the playback period to be played next, the information for identifying the content to be selected at the playback period immediately after a certain playback period is given priority to select the content.

Also, the information for identifying the content to be selected at the playback period immediately after a certain playback period may be information directly specifying content, or may be that for filtering candidates of content to be selected. For example, this may be information specifying group specification information to be selected, or may be information representing multiple candidates of group specification information to be selected.

Also, it is desirable that the identification information included in the content information on that to be selected in a certain playback period as previously described includes information for identifying content to be selected at the playback period immediately before this certain playback period, and when the playback period to be played next is the playback period immediately before a certain playback period as previously described, the aforementioned selection means references the information included in the identification information for identifying the content to be selected at the playback period immediately before a certain playback period to select the content.

According to the aforementioned configuration, the identification information included in the content information on that to be selected in a certain playback period included information for specifying content to be played at the playback period immediately before this certain playback period. Also, when the playback period to be played next is the playback period immediately before a certain playback period as previously described, the playback device references the information included in the identification information for identifying the content to be selected at the playback period immediately before a certain playback period to select the content.

Therefore, the playback device may readily select content depending on the content selected at a certain playback period for the playback period immediately before a certain playback period.

Further, it is desirable that when the information for identifying the content to be selected at the playback period to be played next is included in the identification information, regardless of the positional relationship regarding the playback time axis between a certain playback period and the playback period to be played next, the information for identifying the content to be selected at the playback period immediately before a certain playback period is given priority to select the content.

Also, the information for identifying the content to be selected at the playback period immediately before a certain playback period may be information directly specifying content, or may be that for filtering candidates of content to be selected. For example, this may be information specifying group specification information to be selected, or may be information representing multiple candidates of group specification information to be selected.

Also, it is desirable that when the aforementioned playback period to be played next is separated from a certain playback period as previously described on a timeline, and the aforementioned identification information is included in each playback period existing between a certain playback period as previously described and the playback period to be played next, the aforementioned selection means identifies the content to be selected at the aforementioned playback period to be played next by referencing the aforementioned identification information in order from the playback period immediately before or immediately after a certain playback period as previously described regarding each playback period existing between a certain playback period as previously described and the playback period to be played next.

According to the aforementioned configuration, when the playback period to be played next is separated from a certain playback period on a timeline, the content to be selected at the playback period to be played next may still be identified by using the identification information if the identification information is included in each playback period existing between these playback periods.

For example, the content to be selected at the playback period to be played next may be identified by identifying content in order from the playback period immediately after or immediately before a certain playback period. Also, for example, when the aforementioned identification information specifies information filtering the content to be selected, the information filtering the content to be selected may be identified in order from the playback period immediately before or immediately after a certain playback period, the content may be filtered and selected from the information filtering the content to be selected for the playback period to be played next.

Also, it is desirable that the aforementioned playback device is provisioned with a communication unit configured to receive the aforementioned content information on that to be selected, from an external device, and the aforementioned selection means selects the content using the aforementioned content information on that to be selected which has been received via the aforementioned communication unit.

According to the aforementioned configuration, as the playback device selects content using the content information on that to be selected received via the communication unit, the playback of content may be performed on the playback device on the basis of the transmitted content information on that to be selected by transmitting the content information on that to be selected to the playback device.

Further, the aforementioned external device may be the server from which content is acquired, or may be another external device. Also, the content information on that to be selected may be generated by the aforementioned server, or may be generated by some other device.

Also, other playback devices disclosed in the aforementioned embodiments acquire and play content selected after referencing content information on that to be selected including information representing acquirable content per playback period of the content, and this playback device includes means configured to acquire information identifying an analysis range for identifying an analysis range of the content information on that to be selected for each of the aforementioned playback periods, selection means configured to select content regarding each of the aforementioned playback periods after analyzing the analysis range identified by the aforementioned analysis range identification information acquired by the aforementioned means configured to acquire information identifying an analysis range in the aforementioned content information on that to be selected, acquisition means configured to acquire the content selected by the aforementioned selection means, and playback means configured to play the content acquired by the acquisition means in order of the aforementioned playback periods.

Also, the control method of other playback devices disclosed in the aforementioned embodiments controls the playback device to acquire and play content selected after referencing content information on that to be selected including information representing acquirable content per playback period of the content, and this control method includes a step for acquiring information identifying an analysis range for identifying an analysis range of the content information on that to be selected for each of the aforementioned playback periods, a selection step for selecting content regarding each of the aforementioned playback periods after analyzing the analysis range identified by the aforementioned analysis range identification information acquired by the aforementioned step for acquiring information identifying an analysis range in the aforementioned content information on that to be selected, an acquisition step for acquiring the content selected by the aforementioned selection step, and a playback step for playing the content acquired by the acquisition step in order of the aforementioned playback periods.

According to the aforementioned configuration, the analysis range identification information for identifying the analysis range of the content information on that to be selected in each playback period is acquired, the analysis range identified by this information is analyzed, the content regarding each playback period is selected, and the selected content is acquired and played in the order of the playback periods.

That is to say, according to the aforementioned configuration, the analysis range of the content information on that to be selected can be narrower than compared to a case in which content is selected without using analysis range identification information, and so content for each playback period is readily selected, and this may be acquired and played. Therefore, content depending on the content selected at a certain playback period may be readily selected when transitioning from a certain playback period to the playback period to be played next.

Further, the aforementioned analysis range identification information may be any that enables content depending on the content selected at a certain playback period to be readily selected when transitioning from a certain playback period to the playback period to be played next, and narrows the analysis range of the content information on that to be selected. For example, this may be information specifying attributes shared in the content to be selected at each playback period, or may be information specifying a portion of playback periods from a multiple of the aforementioned playback periods.

Also, it is preferable that the aforementioned analysis range identification information includes analysis range identification information specifying the analysis range of the aforementioned content information on that to be selected in each of the aforementioned playback periods, and the aforementioned selection means analyze the analysis range specified by the aforementioned analysis range identification information, and selects the content for each playback period.

According to the aforementioned configuration, the analysis range identification information includes analysis range identification information specifying the analysis range of the content information on that to be selected in each playback period, and the analysis range specified by the analysis range identification information regarding the content information on that to be selected is analyzed.

In this way, the analysis range of the content information on that to be selected is narrowed by performing an analysis at the range specified for each playback period, and the selection of content is simplified. Also, by specifying the analysis range of each playback period in one of these so-called analysis range identification information, a consistency in the selected content may be maintained. For example, the selection of content of the same language at each playback period and others are enabled.

Also, it is desirable that the aforementioned analysis range identification information includes information specifying periods to be played for specifying a portion of the playback periods from a plurality of the aforementioned playback periods, and the aforementioned selection means perform analysis of the playback periods specified by the aforementioned information specifying periods to be played in the aforementioned content information on that to be selected.

According to the aforementioned configuration, the analysis range identification information includes information specifying periods to be played for specifying a portion of the playback periods from a plurality of the playback periods, and analysis is performed on the playback periods specified by the information specifying periods to be played in the content information on that to be selected.

In this way, by filtering the playback periods to be analyzed with the information specifying periods to be played, the analysis range of the content information on that to be selected is narrowed, and content is readily selected. Also, a portion of the periods of content may be selectively played.

Further, analysis may be performed using both the information specifying periods to be played and the analysis range identification information, and in this case for example, analysis may be performed for the analysis range specified by the analysis range identification information for each playback period specified by the information specifying periods to be played. As a result, the analysis range of the content information on that to be selected is further narrowed, and the selection of content becomes more simplified. Also, a selective playback in which a portion of content having consistency at each playback period is enabled.

Also, it is desirable that the aforementioned playback device is provisioned with identification information generating means to generate, as the aforementioned analysis range identification information, information which includes either of information representing the analysis range when selecting content from the content information on that to be selected including information representing the content played by the aforementioned playback means, and information representing the playback position of the content regarding the aforementioned playback means.

By referencing the analysis range identification information generated according to the aforementioned configuration, either of the analysis range when selecting content from the content information on that to be selected for the content played by the playback means and the playback position regarding the playback means may be identified.

Therefore, by referencing the generated analysis range identification information as previously described, the content which has been played by the playback means may be played from the playback position at which the playback means has been playing. Also, the analysis range when selecting content is filtered by the analysis range identification information, and so the selection of content may be readily performed.

Also, it is desirable that the aforementioned playback device is provisioned with identification information transmitting means configured to transmit the analysis range identification information generated by the aforementioned analysis range identification information to other devices so that the aforementioned content may be played on these devices.

As previously described, by referencing the analysis range identification information generated by the analysis range identification information generating means and analyzing the filtered analysis range, the content played by the playback means may be played from the playback position at which the playback means has been playing. That is to say, according to the aforementioned configuration, the playback state regarding the playback means may be easily handed over to another device.

Here, according to the related art, other than the problems exhibited in [Technical Problem], there has been a problem in which that to be played cannot be switched to content corresponding to another MPD during playback of content based on one MPD. If this kind of switched playback could be performed, variations of content playback may be increased, and so this is desirable.

Further, this is not limited to cases when the selection and playback of content is based on the MPD, this problem is also occurs in cases in which content is selected after referencing selection information representing selection candidates of acquirable content.

One object of the present invention is to provide a playback device and so on that may switch that to be played to content corresponding to other selection information during playback of content using content selection information.

Also, the generating device disclosed in the aforementioned embodiments generates content information on that to be selected including information representing acquirable content per playback period, and this generating device includes identification information generating means configured to generate identification information for identifying content to be played at the playback period to be played next, corresponding to content selected in a certain playback period, and generating means configured to generate the content information on that to be selected including the identification information generated by the aforementioned identification information generating means.

Also, the control method for the generating device disclosed in the aforementioned embodiments controls the generating device to generate content information on that to be selected including information representing acquirable content per playback period, and this control method includes a step for generating identification information for identifying content to be played at the playback period to be played next, corresponding to content selected in a certain playback period, and a step for generating the content information on that to be selected including the identification information generated by the aforementioned step.

According to the aforementioned configuration, the content information on that to be selected is generated including the identification information for identifying the content to be played at the playback period to be played next corresponding to the content selected at a certain playback period.

Therefore, the content playback device may select content to be played in a certain playback period by referencing this content information on that to be selected, and at the same time, may readily select the content to be played at the playback period to be played next in accordance with the aforementioned identification information.

Also, the recording medium disclosed in the aforementioned embodiments is a computer-readable recording medium to which the content information on that to be selected including the information representing acquirable content per playback period is recorded, wherein the aforementioned content information on that to be selected includes identification information for identifying the content to be played at the playback period to be played next corresponding to the content selected at a certain playback period, and the playback device references the aforementioned content information on that to be selected, selects the content to be played in a certain playback period, and at the same time, selects the content to be played at the playback period to be played next in accordance with the aforementioned identification information.

The playback device that reads out the content information on that to be selected from this recording medium may select the content to be played in a certain playback period, and at the same time, may readily selected the content to be played at the playback period to be played next in accordance with the aforementioned identification information.

Also, the data structure disclosed in the aforementioned embodiments is the data structure of the content information on that to be selected including the information representing acquirable content per playback period, and the data structure includes identification information for identifying content to be played at the playback period to be played next corresponding to the content selected at a certain playback period, wherein the playback device references the aforementioned content information on that to be selected, selects the content to be played in a certain playback period, and at the same time, selects the content to be played at the playback period to be played next in accordance with the aforementioned identification information.

The aforementioned data structure includes the identification information for identifying the content to be selected at the playback period to be played next corresponding to the content selected at a certain playback period, and so the playback device may select the content to be played in a certain playback period by using this data structure, and at the same time, may readily select the content to be played at the playback period to be played next in accordance with the aforementioned identification information.

Also, the content selected at a certain playback period as previously described is a portion of a main content extending over multiple playback periods, and the content identified by the aforementioned identification information may be content inserted and played immediately before, immediately after, or during the aforementioned main content.

According to the aforementioned data structure, the content to be inserted and played immediately before, immediately after, or during the main content extending over multiple playback periods is identified by the identification information. Therefore, the playback device using this data structure inserts and plays other content immediately before, immediately after, or during the aforementioned main content. This is applicable to a case in which advertising content is inserted into the main content, for example.

The playback device disclosed in the aforementioned embodiments acquires portions of content selected after referencing the selection information representing selection candidates for portions of content configuring the content to be played in order to resolve the aforementioned problem, and plays the acquired portions of content, wherein the aforementioned selection information includes change destination specification information specifying information on change destinations of selections representing selection candidates of portions of content configuring content with change destinations to be played instead of the aforementioned content to be played, and this playback device is provisioned with selection means configured to select at least a portion of the portion of content configuring the aforementioned content with change destinations after referencing the information on change destinations of selections specified by the aforementioned change destination specification information during playback of the aforementioned content to be played, and playback means configured to acquire the aforementioned portions of content selected by the aforementioned selection means, and play this instead of the aforementioned content to be played.

The control method of the playback device disclosed in the aforementioned embodiments controls the playback device to acquire portions of content selected after referencing the selection information representing selection candidates for portions of content configuring the content to be played in order to resolve the aforementioned problem, and play the acquired portions of content, wherein the aforementioned selection information includes change destination specification information specifying information on change destinations of selections representing selection candidates of portions of content configuring content with change destinations to be played instead of the aforementioned content to be played, and this control method includes a selection step for selecting at least a portion of the portion of content configuring the aforementioned content with change destinations after referencing the information on change destinations of selections specified by the aforementioned change destination specification information during playback of the aforementioned content to be played, and a playback step for acquiring the aforementioned portions of content selected by the aforementioned selection step, and playing this instead of the aforementioned content to be played.

According to the aforementioned configuration, the change destination specification information specifying the information on change destinations of selections used for playback of content with change destinations is included in the selection information used for playback of content. Also, portions of content (portions of content) with change destinations are selected using the information on change destinations of selections specified by the change destination specification information included in this selection information, and the selected portions of content is acquired and played.

That is to say, according to the aforementioned configuration, the content to be played corresponding to the selection information and the content with change destinations corresponding to the information on change destinations of selections are linked by the selection information, and that to be played may be changed from the content currently playing to the content with change destinations.

Also, it is desirable that the aforementioned change destination specification information includes playback position specification information for specifying the playback position of the aforementioned content with change destinations, wherein the aforementioned selection means select portions of content corresponding to the playback position specified by the aforementioned playback position specification information from the portions of content configuring the aforementioned content with change destinations.

According to the aforementioned configuration, the change destination specification information included playback position specification information specifying the playback position of the content with change destinations, and the portions of content corresponding to the playback position specified by this information is selected. As a result, the content to be played is changed from the content currently playing to the portions of content regarding the content with change destinations corresponding to the aforementioned playback position. That is to say, according to the aforementioned configuration, playback of the content with destinations from the playback position specified by the playback position specification information is enabled.

Also, it is desirable that the aforementioned selection information includes the aforementioned playback position specification information specifying the playback position depending on the playback period in each playback period of the aforementioned content, wherein the aforementioned selection means select the portions of content corresponding to the playback position specified by the playback position specification information corresponding to the playback period of the aforementioned content played by the aforementioned playback means form the portions of content configuring the aforementioned content with change destinations.

According to the aforementioned configuration, portions of content corresponding to the playback position specified by the playback position specification information corresponding to the playback period of the content currently playing is selected from the portions of content configuring the content with change destinations. Therefore, the content with change destinations may be played from the playback position depending on the playback period of the content currently playing.

Also, it is desirable that the aforementioned content and the portions of content configuring the content with change destinations are both configured as multiple segments, wherein the aforementioned selection information includes identification information for identifying the segments configuring the aforementioned content, the aforementioned information on change destinations of selections includes identification information for identifying the segments configuring the aforementioned content with change destinations, the aforementioned playback position specification information is information representing the segments of the content with change destinations including identification information corresponding to the segments of the aforementioned content played by the aforementioned playback means, and the aforementioned selection means select the segments represented by the aforementioned playback position specification information.

According to the aforementioned configuration, the playback position is specified by the segments configuring the portions of content regarding the content with change destinations. Therefore, the playback position may be finely specified as compared to a case in which the playback position is specified at the portions of content configuring the content with change destinations.

Also, it is desirable that the aforementioned content with change destinations is content in which the same contents of the aforementioned content has different playback speeds, wherein identification information included in the aforementioned selection information and identification information included in the aforementioned information on change destinations of selections are set so that the segments corresponding to the identification information are the same contents with different playback speeds.

According to the aforementioned configuration, the content with change destinations is content in which the same contents of the aforementioned content has different playback speeds, and the identification information included in the aforementioned selection information and the identification information included in the aforementioned information on change destinations of selections are set so that the segments corresponding to the identification information are the same contents with different playback speeds.

Therefore, the segments in which the contents of the content currently playing until the time when changing to the content with change destinations are the same and having different playback speeds are played. That is to say, according to the aforementioned configuration, a trick play is enabled in which the playback speed changes during playback of the content.

Further, the aforementioned playback device and the aforementioned generating device may be implemented by a computer, and in this case, by operating the computer as each of the means of the aforementioned playback device and the aforementioned generating device, a control program for implementing the aforementioned playback device and the aforementioned generating device on a computer, and a computer-readable recording medium for recording to this is within the scope of the present invention.

INDUSTRIAL APPLICABILITY

The present invention may be used in a playback device or similar playing content acquired via a network.

REFERENCE SIGNS LIST 1 client (playback device)
2 server (generating device)
12 client communication unit (communication unit)
13 content selection unit (selection means, means configured to acquire analysis range identification information)
14 request execution unit (acquisition means)
15 content playback unit (playback means, means configured to generate analysis range identification information, identification information transmitting means)
23 description information transmitting unit (identification information generating means, generating means)
25 content
26 description information (content information on that to be selected, information on change destinations of selections)

The invention claimed is:
1. A playback device comprising:
selection circuitry that selects content to be played at each playback period from selection candidates, each respectively represented by at least one of:
first candidate information identified using first identification information and second candidate information identified using second identification information, acquisition circuitry that acquires the content selected by the selection circuitry; and playback circuitry that plays the content acquired by the acquisition circuitry; wherein the playback device obtains and plays the content selected after referencing content information including information representing acquirable content in each playback period, and in each playback period:

at least one of the first candidate information representing one or a plurality of content is included in the content information, the first identification information is correlated with each of the at least one of the first candidate information, at least one of the second candidate information, representing one or a plurality of the first candidate information, is included in the content information, the second identification information is correlated with each of the at least one of the second candidate information, the second identification information is set such that content with continuity between a current playback period and a next playback period is selected, by selecting content using the second identification information; and the second candidate information correlated with the second identification information of a same value between the current playback period and the next playback period.

* * * * *